(12) United States Patent
Shramkova et al.

(10) Patent No.: US 12,044,860 B2
(45) Date of Patent: Jul. 23, 2024

(54) INHOMOGENEOUS MICROLENS DEVICE FOR NEAR-FIELD FOCUSING, BEAM FORMING, AND HIGH-EFFICIENCY FAR-FIELD DEVICE IMPLEMENTATION

(71) Applicant: InterDigital CE Patent Holdings, Paris (FR)

(72) Inventors: Oksana Shramkova, Cesson-Sévigné (FR); Mitra Damghanian, Cesson-Sévigné (FR); Valter Drazic, Betton (FR)

(73) Assignee: INTERDIGITAL CE PATENT HOLDINGS, SAS, Paris (FR)

( * ) Notice: Subject to any disclaimer, the term of this patent is extended or adjusted under 35 U.S.C. 154(b) by 668 days.

(21) Appl. No.: 17/282,349

(22) PCT Filed: Oct. 1, 2019

(86) PCT No.: PCT/EP2019/076596
§ 371 (c)(1),
(2) Date: Apr. 1, 2021

(87) PCT Pub. No.: WO2020/070129
PCT Pub. Date: Apr. 9, 2020

(65) Prior Publication Data
US 2021/0356756 A1  Nov. 18, 2021

(30) Foreign Application Priority Data
Oct. 1, 2018  (EP) .................................... 18198052

(51) Int. Cl.
*G02B 27/56* (2006.01)
*G02B 3/00* (2006.01)
(Continued)

(52) U.S. Cl.
CPC .......... *G02B 27/56* (2013.01); *G02B 3/0043* (2013.01); *G02B 5/1814* (2013.01); *G02B 27/0955* (2013.01); *G02B 2207/101* (2013.01)

(58) Field of Classification Search
CPC .... G02B 27/56; G02B 3/0043; G02B 5/1814; G02B 27/0955; G02B 2207/101
(Continued)

(56) References Cited

U.S. PATENT DOCUMENTS 7,394,535 B1  7/2008  Chen
8,003,965 B2  8/2011  Grbic
(Continued)

FOREIGN PATENT DOCUMENTS

CN    101793982 A    8/2010
CN    204009237 U    12/2014
(Continued)

OTHER PUBLICATIONS

Itagi, A. V., et al., , "Optics of Photonic Nanojets". Optical Society of America. J. Opt. Soc. Am. A , Vo.22, Dec. 2005 pp. 2847-2858 (12 pages).
(Continued)

*Primary Examiner* — William Choi
(74) *Attorney, Agent, or Firm* — Klintworth & Rozenblat IP LLP

(57) ABSTRACT

The disclosure relates to an optically-transparent device (100) comprising a main part (10) of dielectric material having a refractive index $n_2$. Such an optically-transparent device is configured for forming a field intensity distribution in a near zone of said device, from electromagnetic waves incidentally illuminating said device, when said device is embedded in a dielectric material having a refractive index $n_1$ lower than said refractive index $n_2$. Said device (100) further comprises at least one insert (11) of dielectric mate-
(Continued)

rial having a refractive index $n_3$ lower than said refractive index $n_2$ and different from said refractive index $n_1$, said at least one insert being inserted into said main part, and each one of said at least one insert and said main part having respectively an edge of a step formed by a base surface of said at least one insert or said main part and a lateral surface of said at least one insert or said main part, said base surface being defined with respect to an arrival direction of said electromagnetic wave. The disclosure also relates to a system comprising a plurality of above-described optically-transparent devices uniformly distributed within a dielectric host medium, so as to form a far-field device for far-field applications.

14 Claims, 19 Drawing Sheets

(51) Int. Cl.
  G02B 5/18    (2006.01)
  G02B 27/09   (2006.01)
(58) Field of Classification Search
  USPC .......................................................... 359/619
  See application file for complete search history.

(56) References Cited

U.S. PATENT DOCUMENTS

| | | |
|---|---|---|
| 8,554,031 B2 | 10/2013 | Astratov |
| 8,953,064 B1 | 2/2015 | Ng |
| 2004/0263860 A1 | 12/2004 | Johnson |
| 2007/0115787 A1 | 5/2007 | Itagi |
| 2011/0235166 A1 | 9/2011 | Zhu |
| 2013/0308127 A1 | 11/2013 | Bisht |
| 2014/0111677 A1 | 4/2014 | Fukuda |
| 2015/0248790 A1 | 9/2015 | Schowengerdt |
| 2016/0054172 A1 | 2/2016 | Roh |
| 2016/0274281 A1 | 9/2016 | Lutolf |

FOREIGN PATENT DOCUMENTS

| | | |
|---|---|---|
| CN | 105765421 A | 7/2016 |
| CN | 107229096 | 10/2017 |
| EP | 3223062 A1 | 9/2017 |
| EP | 3223063 A1 | 9/2017 |
| EP | 3312646 A1 | 4/2018 |
| EP | 3312660 A1 | 4/2018 |
| EP | 3433663 A1 | 1/2019 |
| EP | 3688520 A1 | 8/2020 |
| EP | 3765873 A1 | 1/2021 |
| RU | 161592 U1 | 4/2016 |
| RU | 178616 U1 | 4/2018 |
| TW | 200741686 A | 11/2007 |
| WO | 2016020831 A1 | 2/2016 |
| WO | 2017162880 A1 | 9/2017 |
| WO | 2018073426 A1 | 4/2018 |
| WO | 2018122267 A1 | 7/2018 |

OTHER PUBLICATIONS

International Preliminary Report on Patentability for PCT/EP19/076608 mailed Apr. 15, 2021, 9 pages.
International Preliminary Report on Patentability for PCT/EP2019/076596 mailed Apr. 15, 2021, 11 pages.
Kong, Soon-Cheol, et. al., "Photonic Nanojet-Enabled Optical Data Storage". Optical Society of America, Optics Express, vol. 16, No. 18, Sep. 1, 2008, pp. 13713-13719.
Pacheco-Peña, V., et. al., "Terajets Produced by Dielectric Cuboids". Applied Physics Letters 105, 084102, (2014), doi: 10.1063/1.4894243, 5 pages.
Heifetz, Alexander, et. al., "Subdiffraction Optical Resolution of a Gold Nanosphere Located Within the Nanojet of a Mie-Resonant Dielectric Microsphere". Optical Express, vol. 15, No. 25, (2007), 17334-17342.
Devilez, Alexis, et. al., "Three-Dimensional Subwavelength Confinement of Light With Dielectric Microspheres". Optical Express, vol. 17, No. 4, (2009), 2089-2094.
Shen, Yuecheng, et. al., "Ultralong Photonic Nanojet Formed by a Two-Layer Dielectric Microsphere". Optical Letters, Optical Society of America, vol. 39, No. 14, Jul. 15, 2014, 4120-4123.
Ruiz, César Méndez, et. al., "Detection of Embedded Ultrasubwavelength-Thin Dielectric Features Using Elongated Photonic Nanojets". Optical Express, vol. 18, No. 16, Aug. 2, 2010, pp. 16805-16812.
Geints, Yuri E., et. al., "Photonic Nanojet Calculations in Layered Radially Inhomogeneous Micrometer-Sized Spherical Particles". Optical Society of America, vol. 28, No. 8, Aug. 2011, 1825-1830.
Gu, Guoqiang, et. al. "Super-Long Photonic Nanojet Generated from Liquid-Filled Hollow Microcylinder". Optical Society of America, Optical Letters, vol. 40, No. 4, Feb. 15, 2015, pp. 625-628.
International Search Report and Written Opinion of the International Searching Authority for PCT/EP2019/076608 mailed Dec. 19, 2019, 11 pages.
Pacheco-Peña, V., et. al., "Multifrequency Focusing and Wide Angular Scanning of Terajets". Optical Society of America, Optics Letters, vol. 40, No. 2, (2015), 5 pages.
International Search Report and Written Opinion of the International Searching Authority for PCT/EP2019/076596 mailed Dec. 20, 2019, 14 pages.
Zhao, Y. et. al., "Beam Bending Via Plasmonic Lenses". Optics Express, vol. 18, No. 22, Oct. 25, 2010, pp. 23458-23465 (8 pages).
Kress, Bernard, et. al., "A Review of Head-Mounted Displays (HMD) Technologies and Applications for Consumer Electronics". Proceedings of SPIE, vol. 8720, (2013), pp. 87200A-1-87200A-13 (13 pages).
Novotny, Lukas, et. al., "Near-field Optical Microscopy and Spectroscopy with Pointed Probes". Annual Review of Physical Chemistry, vol. 57, (2006) pp. 303-331 (29 pages).
Tirosh, Udi, "New Flat Lenses Technology Could Offer Smaller Lenses With Zero Chromatic Aberration". DIY Photography, Feb. 20, 2015, 8 pages.
Darafsheh, Arash, et al., "The effect of the background medium in microsphere-assisted microscopy", Proceedings of the SPIE—Progress in Biomedical Optics and Imaging, vol. 1007, 6 pages.
Chen, W., T., et. al., "Super-Dispersive Off-Axis Meta-Lenses for Compact High Resolution Spectroscopy", CLEO: Science and Innovations 2016, San Jose, CA, Jun. 5-10, 2016, 2 pages.
Nishiwaki, Seiji, "Efficient Colour Splitters for High-Pixel-Density Image Sensors". Nature Photonics, vol. 7, Mar. 2013, pp. 240-246 (7 pages).
Darafsheh, Arash, et al., "Systematic study of the characteristics of the photonic nanojets formed by dielectric microcylinders", Optics Communications, vol. 402, 2017, 6 pages.
Yi, J, et. al., "Coherent Beam Control With an All-Dielectric Transformation Optics Based Lens". Scientific Reports, vol. 6, No. 1, Jan. 5, 2016, pp. 1-8 (8 pages).
Guo, Si Yue, et. al., "Fabrication of Optical Fiber Probes for Scanning Near-Field Optical Microscopy". McGill Science Undergraduate Research Journal (MSURJ) vol. 3, No. 1, Mar. 2008, pp. 32-39 (8 pages).
Heifetz, Alexander, et. al., "Photonic Nanojets". Journal of Computational Theoretical Nanoscience, vol. 6, No. 9., (2009), pp. 1979-1992 (14 pages).
Hua, Hong, et. al., "A 3D Integral Imaging Optical See-Through Head-Mounted Display". Optical Society of America, Optics Express, vol. 22, No. 11, Jun. 2, 2014, pp. 13484-13491, (8 pages).
Liu, Z., et. al., "Tuning the Focus of a Plasmonic Lens by the Incident Angle". Applied Physics Letters, vol. 88, No. 17, 2006, pp. 171108-1-171108-2 (3 pages).
Gu, Yinghong, et. al., "Color Generation Via Subwavelength Plasmonic Nanostructures". Nanoscale, vol. 7, (2015), pp. 6409-6419 (11 pages).

(56) References Cited

OTHER PUBLICATIONS

Mukawa, Hiroshi, et. al., "A Full-Color Eyewear Display Using Planar Waveguides with Reflection Volume Holograms". Journal of the Society for Information Display (SID), vol. 17, No. 3, (2009), pp. 185-193 (9 pages).
Mao, X., et. al., "Tunable Photonic Nanojet Formed by Generalized Luneburg Lens". Optics Express, vol. 23, No. 20, 2015, pp. 26426-26433 (8 pages).
Chen, Y., et. al., "Engineering the Phase Front of Light With Phase-Change Material Based Planar Lenses". Scientific Reports vol. 5, No. 1, Mar. 2, 2015, pp. 1-7 (7 pages).
Yue, Liyang, et al., "Production of photonic nanojets by using pupil-masked 3D dielectric cuboid", Journal of Physics D: Applied Physics, vol. 50, 2017, 6 pages.
Grbic, Anthony, et. al., "Near-Field Plates: Subdiffraction Focusing with Patterned Surfaces". Science, vol. 320, Issue. 5875, Apr. 25, 2008, 11 pages.
Jun, Y. C., et. al., "Optical Manipulation With Plasmonic Beam Shaping Antenna Structures". Advances in OptoElectronicsm, 2012 (7 pages).
Darafsheh, Arash, et al., "Photonic nanojet properties of dielectric microcylinders", Proceedings of the SPIE, vol. 10106, 101061U, 6 pages.
Chen Y., et al., "Near field distribution of photonic nanojet formed by perfectly concentric core-shell structure" High Power Laser and Particle Beams, Sep. 2017 vol. 29 No. 9 (18 pages).

$H_2$ (nm)

$H_2$ (nm)

$W_2$ (nm)

$H_1$ (nm)

$W_1$ (nm)

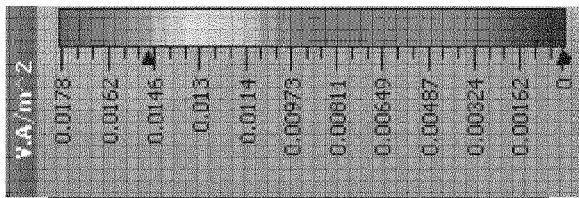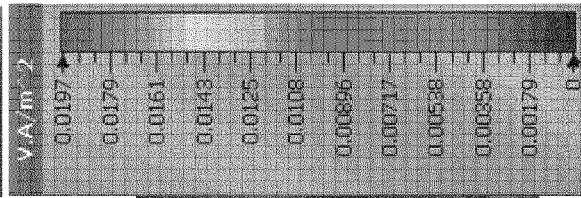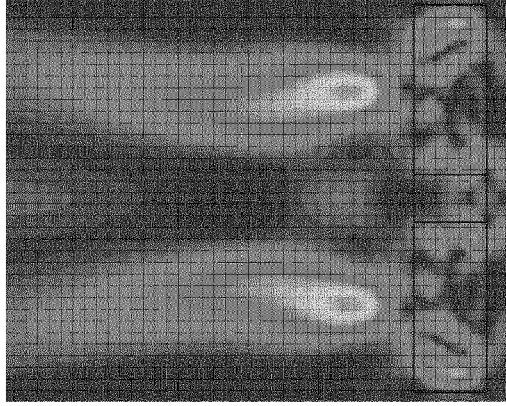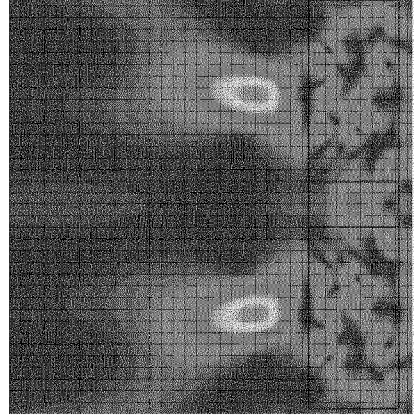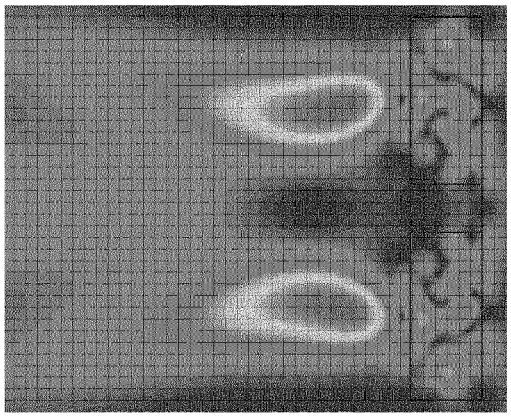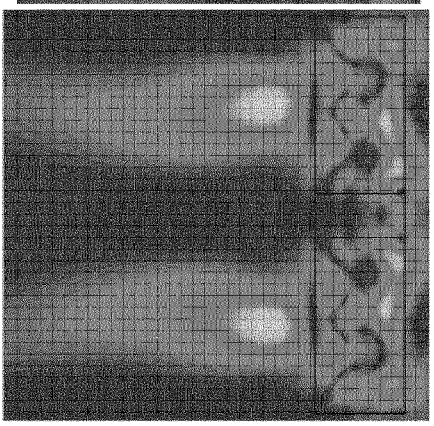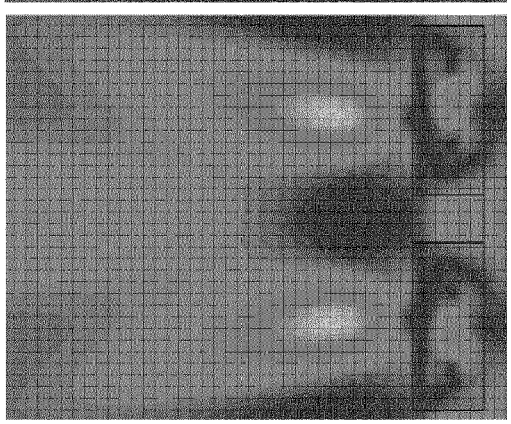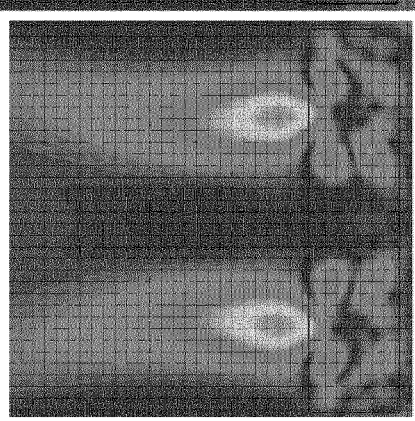
Fig. 10a
Fig. 10b λ (nm)

(a)　　　(b)　　　(c)

$Z_0 = 548.2$ nm　　$Z_0 = 701$ nm

INHOMOGENEOUS MICROLENS DEVICE FOR NEAR-FIELD FOCUSING, BEAM FORMING, AND HIGH-EFFICIENCY FAR-FIELD DEVICE IMPLEMENTATION

The present application is a national stage application under 35 U.S.C. 371 of International Application No. PCT/EP2019/076596, entitled "INHOMOGENEOUS MICROLENS DEVICE FOR NEAR-FIELD FOCUSING, BEAM FORMING, AND HIGH-EFFICIENCY FAR-FIELD DEVICE IMPLEMENTATION", filed on Oct. 1, 2019, which claims benefit under 35 U.S.C. § 119(e) from European Patent Application Serial No. 18198052.5, entitled "INHOMOGENEOUS MICROLENS DEVICE FOR NEAR-FIELD FOCUSING, BEAM FORMING, AND HIGH-EFFICIENCY FAR-FIELD DEVICE IMPLEMENTATION", filed Oct. 1, 2018.

1. FIELD OF THE DISCLOSURE

The present disclosure relates generally to a microlens device for focusing of electromagnetic waves (and among them visible light). More particularly, the microlens device according to the disclosure can be used for near-field focusing and beam forming, but also as element of a far-field device, for far-field applications.

2. BACKGROUND

The present section is intended to introduce the reader to various aspects of art, which may be related to various aspects of the present disclosure that are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

The electromagnetic wave focusing is an established way to increase locally the magnitude of the field intensity and, in such a way, to enhance efficiency of a range of devices. A common example are electro-optical sensors (image sensors) whose operational principles rely on the conversion of the energy propagating in space in the form of an electromagnetic wave into an output voltage or current. Image sensors are in the heart of almost every portable electronic device now, from smartphones and tablets to professional light-field cameras. Optical memory storage heads, optical pens and optical tips can be other examples of devices benefiting from locally controlled and enhanced field intensity. Local field enhancement is also used in a variety of other applications at different wavelength ranges. For example, optical focusing and beam forming is of a great interest for the emerging technology known as augmented reality (AR) and virtual reality (VR) glasses. Here, various types of refractive and diffractive lenses and beam-forming components are used to guide the light from a micro-display or a projector towards the human eye, allowing forming a virtual image that is superimposed with an image of the physical world seen with a naked eye (in case of AR glasses) or captured by a camera (in case of VR glasses).

With the advent of nanotechnology, the ever-increasing interest to explore the optical world at nanoscale has presented the demand to manipulate visible light in the sub-wavelength scale. Researchers have made significant efforts to decrease the size of optical lenses to micron and submicron scale for this very purpose. However, due to diffraction limit, their efforts are hindered when the size of a lens approaches the wavelength of the light. The planar lens, thanks to its small thickness and excellent focusing capability, has been developed to replace its dielectric counterpart as a paradigmatic nanophotonic component. Several types of planar lenses have been studied so far, for example zone plates, nano-slit and nano-hole arrays, photonics crystals and metasurfaces. Although different terminologies are used in the aforementioned techniques, they share the same principle of focusing, which is to generate a constructive interference at the focal point by curving the phase front of an incident plane wave. The performance of such planar lenses has been optimized, but at the cost of sophisticated design. Moreover, most of the proposals so far lack the possibility to control the focal spot position.

Based on the above, one can conclude that there is a need for non-complicated microlens components (relying on simple topology with less fabrication difficulties, for example compatible with established micro-fabrication and nano-fabrication techniques) enabling better performance characteristics (focusing functions, for example) while at the same time providing additional possibility to control the focal spot position.

3. SUMMARY

According to an aspect of the present disclosure, an optically-transparent device is disclosed. Such a device comprises a main part of dielectric material having a refractive index $n_2$, and is configured for forming a field intensity distribution in a near zone of the device from electromagnetic waves incidentally illuminating the device, when the device is embedded in a dielectric material having a refractive index $n_1$ lower than said refractive index $n_2$. Said device further comprises at least one insert of dielectric material having a refractive index $n_3$ lower than said refractive index $n_2$, said refractive index $n_3$ being different from said refractive index $n_1$, said at least one insert being inserted into said main part. A width of said main part and a width of said at least one insert are furthermore configured so that $W_1-W_2 \geq \lambda/2$ and $2W_1 \leq 10\lambda$, where $W_1$ corresponds to the half-width of said main part, $W_2$ corresponds to the half-width of said at least one insert, and $\lambda$ corresponds to the wavelength of said electromagnetic waves in the material of said main part, and each one of said at least one insert and said main part having respectively an edge of a step formed by a base surface of said at least one insert or said main part and a lateral surface of said at least one insert or said main part, said base surface being defined with respect to an arrival direction of said electromagnetic wave.

In that way, an inhomogeneous microstructure, easy to manufacture, is obtained. Advantageously, according to the present disclosure, this inhomogeneous microstructure acts as a microlens, where two different dielectric materials (the material of the main part and the material of the insert) are combined in such a way that some nanojet beams originating from different edges of the microlens (edges of the main part of the microlens and edges of the insert) recombine and contribute to the formation of at least two nanojet beams located out of an axis of symmetry of the microlens main part, in a vertical cross section of the microlens. Such an inhomogeneous microstructure can be used for designing a new kind of near-field focusing device with controllable focal spot position. More particularly, the characteristics of the nanojet beams formed by the above disclosed inhomogeneous microlens are controllable by adjusting the parameters of the constitutive parts of the microlens (i.e. refractive index ratios between the main part of the lens, insert and host medium surrounding the microlens, size and shape of the constitutive parts, and position of the insert). Moreover, the system may be designed to be anisotropic, leading to the dependence of the response of the proposed microlens on the side of the device onto which the electromagnetic waves incidentally illuminate. The disclosed inhomogeneous microlenses may also be used as elements of a far-field device, such as a diffraction grating, for far-field applications, as introduced later according to another aspect of the disclosure.

According to an embodiment of the present disclosure, said electromagnetic waves are incident from a bottom surface of said optically-transparent device, resulting in the formation of two nanojet beams located respectively at focal positions ($R_{fL}$, $H_{fL}$) and ($R_{fR}$, $H_{fR}$) given by approximate formulas:

$$R_{fL} \approx \frac{\tan\Theta_{B2} W_1 + \tan\Theta_{B1}\tan\Theta_{B2}(H_2 - H_1) + \tan\Theta_{B1} W_s}{\tan\Theta_{B1} + \tan\Theta_{B2}},$$

$$H_{fL} \approx \frac{W_1 - R_{fL}}{\tan\Theta_{B1}}$$

$$R_{fR} \approx \frac{\tan\Theta_{B2} W_1 + \tan\Theta_{B1}\tan\Theta_{B2}(H_2 - H_1) + \tan\Theta_{B1}(2W_2 - W_s)}{\tan\Theta_{B1} + \tan\Theta_{B2}},$$

$$H_{fR} \approx \frac{W_1 - R_{fR}}{\tan\Theta_{B1}}$$

$R_{fL}$ and $R_{fR}$ representing the distance of said focal positions from an axis of symmetry of said main part;
$H_{fL}$ and $H_{fR}$ representing the distance of said focal positions from the bottom surface of said device;
where $H_1$ corresponds to the height of said main part, $W_1$ corresponds to the half-width of said main part, $H_2$ corresponds to the height of said at least one insert, $W_2$ corresponds to the half-width of said at least one insert, $W_S$ corresponds to a position of a left edge of said at least one insert regarding said axis of symmetry of the main part, $\theta_{B2}$ is given by $$\theta_{B2} \approx \frac{90° - \sin^{-1}\left(\frac{n_3}{n_2}\right)}{2},$$

and $\theta_{B1}$ is given by $$\theta_{B1} \approx \frac{90° - \sin^{-1}\left(\frac{n_1}{n_2}\right)}{2}.$$

According to another embodiment of the present disclosure, said electromagnetic waves are incident from a top surface of said optically-transparent device, resulting in the formation of two nanojet beams located respectively at focal positions ($R_{fL}$, $H_{fL}$) and ($R_{HfR}$) given by approximate formulas:

$$R_{fL} \approx \frac{\tan\Theta_{B2} W_1 + \tan\Theta_{B1} W_s}{\tan\Theta_{B1} + \tan\Theta_{B2}}, H_{fL} \approx \frac{W_1 - R_{fL}}{\tan\Theta_{B1}}$$

$$R_{fR} \approx \frac{\tan\Theta_{B2} W_1 + \tan\Theta_{B1}(2W_2 - W_s)}{\tan\Theta_{B1} + \tan\Theta_{B2}}, H_{fR} \approx \frac{W_1 - R_{fR}}{\tan\Theta_{B1}}$$

$R_{fL}$ and $R_{fR}$ representing the distance of said focal positions from an axis of symmetry of said main part;
$H_{fL}$ and $H_{fR}$ representing the distance of said focal positions from the bottom surface of said device;
where $H_1$ corresponds to the height of said main part, $W_1$ corresponds to the half-width of said main part, $H_2$ corresponds to the height of said at least one insert, $W_2$ corresponds to the half-width of said at least one insert, $W_S$ corresponds to a position of a left edge of said at least one insert regarding said axis of symmetry of the main part, $\theta_{B2}$ is given by $$\theta_{B2} \approx \frac{90° - \sin^{-1}\left(\frac{n_3}{n_2}\right)}{2},$$

and $\theta_{B1}$ is given by $$\theta_{B1} \approx \frac{90° - \sin^{-1}\left(\frac{n_1}{n_2}\right)}{2}.$$

In that way, hot spot positions of the at least two generated nanojet beams are precisely controllable, by adjusting the dimensions and the relative positions of the constitutive parts of the microlens (main part and insert), and/or by selecting a side (top or bottom) of the microlens to illuminate.

According to an embodiment of the present disclosure, a shape of said main part and a shape of said at least one insert belong to the group comprising: a cuboid, a cylinder, a cone, a truncated cone, a prism.

In that way, the optically-transparent device stays simple to manufacture.

According to embodiment of the present disclosure, said main part and said at least one insert may have vertical lateral surfaces or non-vertical lateral surfaces. For example the main part and the insert have prismatic shapes. By vertical lateral surfaces, it is meant here surfaces parallel to a z-axis of a xyz orthogonal referential, when a bottom surface of the device is parallel to the x-y plane. A shape with vertical lateral surfaces is said to have a base angle of 90° with the x-y plane. By non-vertical lateral surfaces, it is meant here that the shape of the main part and the insert has a base angle different from 90° with the x-y plane.

According to another embodiment of the present disclosure, the top edge of said at least one insert coincides with the top edge of said main part and the height of said at least one insert equals the height of said main part. In that case, the response of the device does not depend on the side of electromagnetic plane wave incidence, that is the device has isotropic properties. This embodiment corresponds to the case where the top edges and bottom edges of the main part and the insert respectively correspond.

According to another embodiment of the present disclosure, the top edge of said at least one insert is below the top edge of said main part, or the top edge of said at least one insert coincides with the top edge of said main part and the height of said at least one insert is smaller that the height of said main part.

In these variants, the device's response is anisotropic, that is the device's response depends on the side of plane wave incidence.

According to an embodiment of the present disclosure, said main part and said at least one insert share at least one same axis of symmetry.

In that way, the generated nanojet beams, which are located out of this axis of symmetry, are symmetrical about said axis of symmetry. They also share a similar power density distribution.

According to an embodiment of the present disclosure, an axis of symmetry perpendicular to a top surface of said at least one insert is shifted from an axis of symmetry perpendicular to a top surface of said main part.

According to this embodiment, the insert is shifted with regards to the axis of symmetry of the main part of the microlens. Such a shift can also be expressed as the shift of one of the lateral edge of the insert, for instance the left edge, with regards to the axis of symmetry of the main part of the microlens along the lateral direction. In that way, the generated nanojet beams, which are located out of the axis of symmetry of the main part, are not symmetrical about this axis of symmetry, thus allowing obtaining non-symmetrical response from the proposed inhomogeneous microlens (both in terms of position and power density distribution of the generated nanojet beams).

According to an embodiment of the present disclosure, said dielectric material of said main part or of said at least one insert belongs to the group comprising:
glass;
plastic;
a polymer material.

According to another aspect of the present disclosure, a system is disclosed which comprises a dielectric host medium with refractive index $n_1$ and at least one optically-transparent device according to any one of the embodiments cited above embedded into said dielectric host medium.

According to an embodiment of the present disclosure, said system further comprises a dielectric substrate with refractive index $n_4$ acting as a support layer, and said at least one optically-transparent device according to any one of the embodiments cited above is placed on said dielectric substrate.

According to an embodiment of the present disclosure, said system comprises a plurality of optically-transparent devices according to any one of the embodiments cited above, said optically-transparent devices being uniformly distributed within said dielectric host medium.

In that way, according to these aspects of the present disclosure, it is notably possible to form a non-complicated diffraction grating (i.e. easy to manufacture compared to conventional diffraction grating) having high diffraction efficiency and allowing far-field applications, by uniformly distributing a plurality of the proposed optically-transparent devices within a dielectric host medium.

It is to be understood that both the foregoing general description and the following detailed description are exemplary and explanatory and are not restrictive of the disclosure, as claimed.

It must also be understood that references in the specification to "one embodiment" or "an embodiment", indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

4. BRIEF DESCRIPTION OF THE DRAWINGS

Embodiments of the present disclosure can be better understood with reference to the following description and drawings, given by way of example and not limiting the scope of protection, and in which:

FIGS. 10a and 10b show power density distribution of the nanojet beams generated by two sizes of inhomogeneous microlenses illuminated at various wavelengths, according to an embodiment of the disclosure;

FIGS. 11b and 11c show power density distribution of the nanojet beams generated by an inhomogeneous microlens having the topology of FIG. 11a, respectively in xz-plane (FIG. 11b) and xy-plane (FIG. 11c) of the microlens, according to an embodiment of the disclosure;

Figure 15:
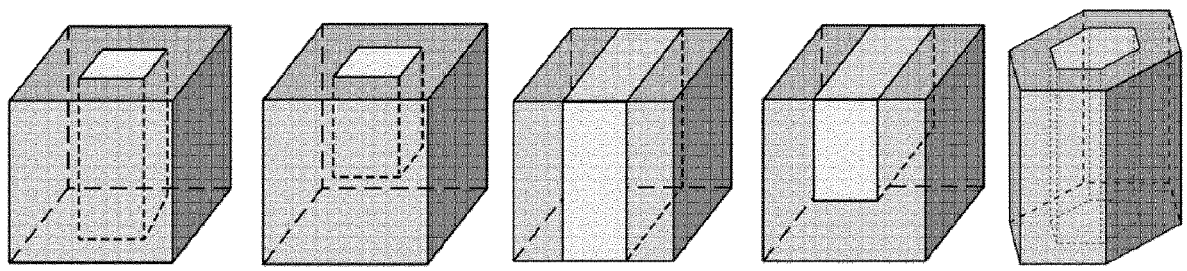
Figure 16:
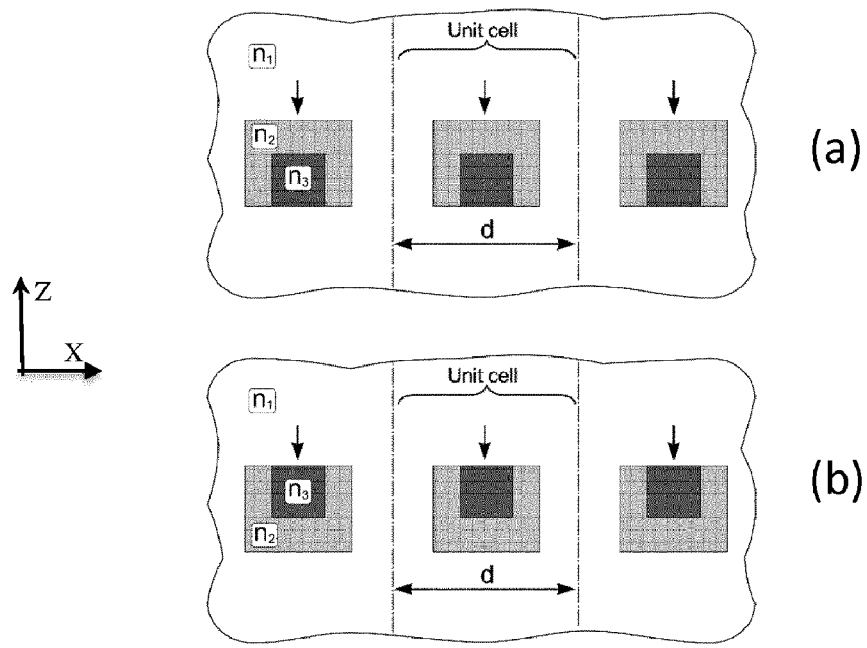
Figure 17:
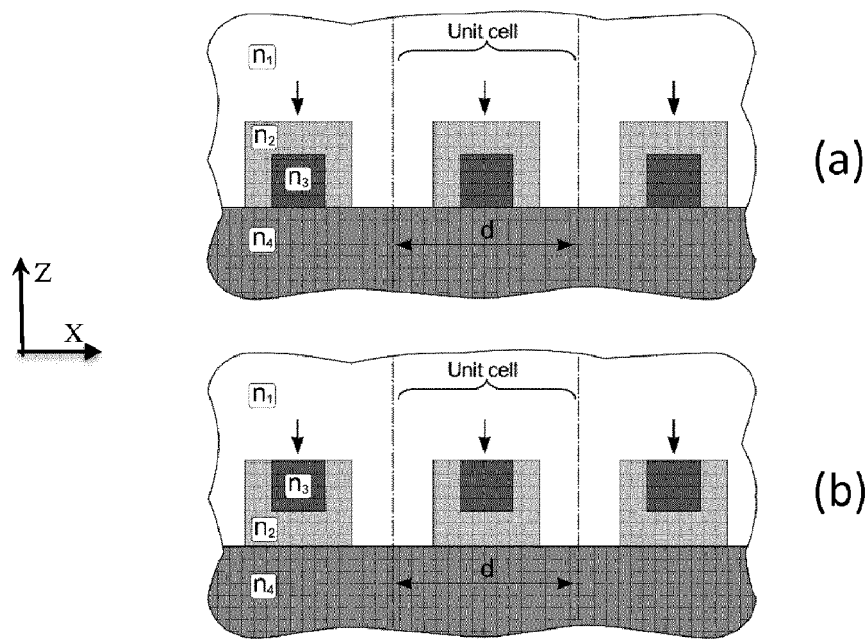
Figure 18:
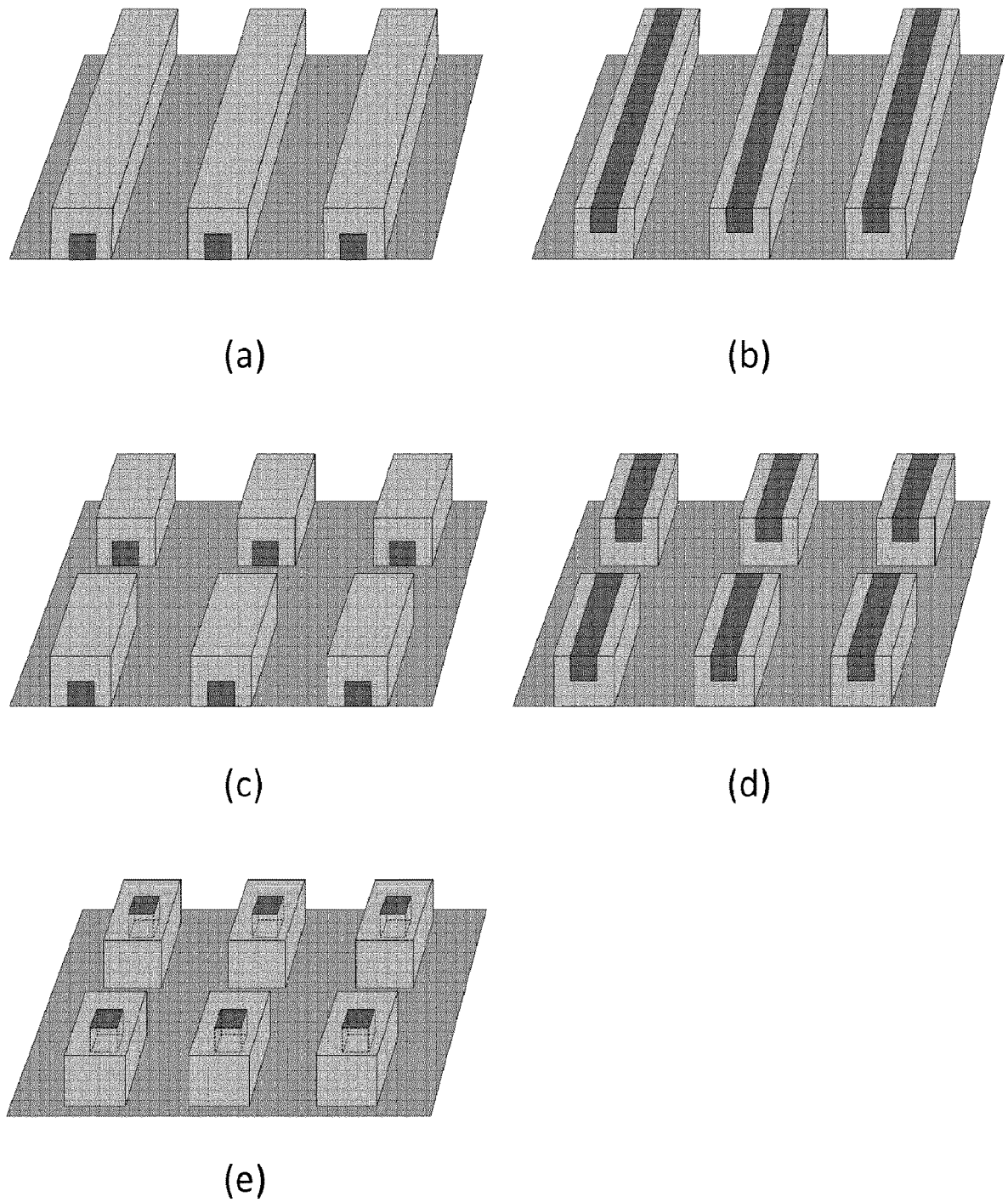
Figure 20A:
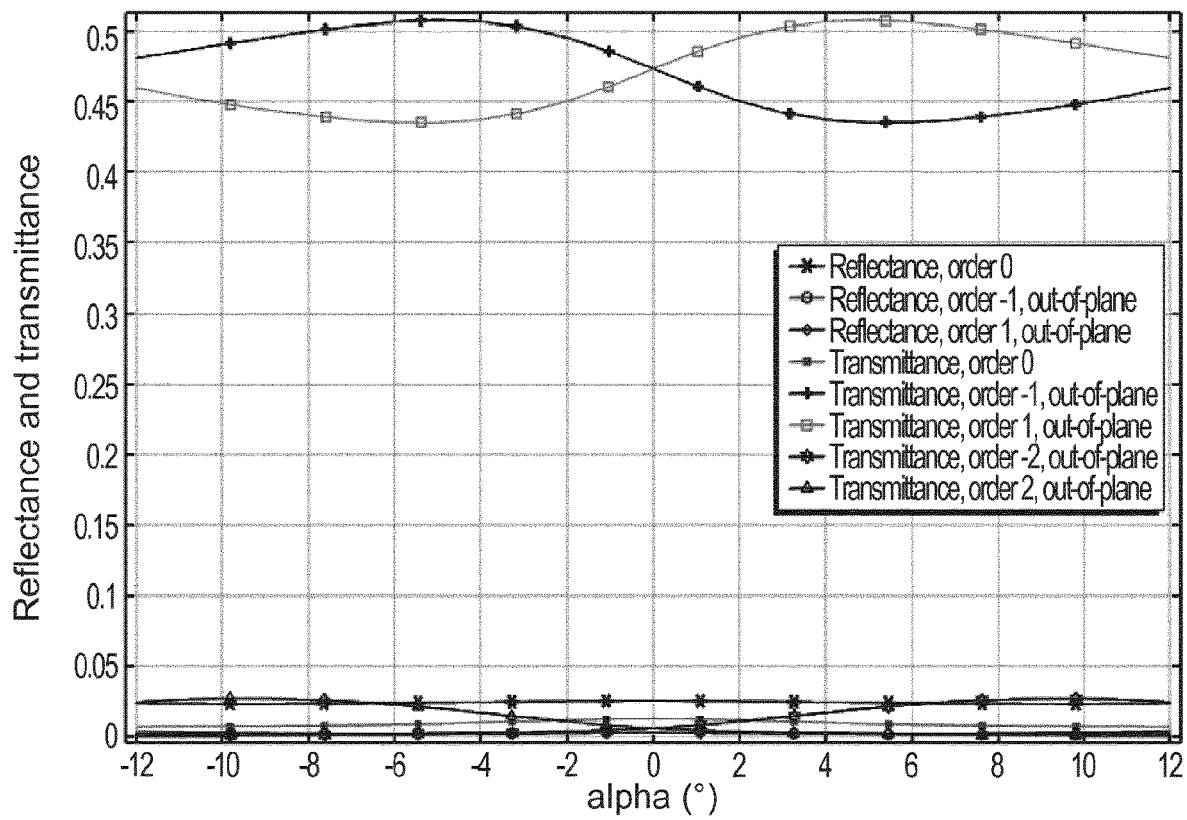
Figure 20B:
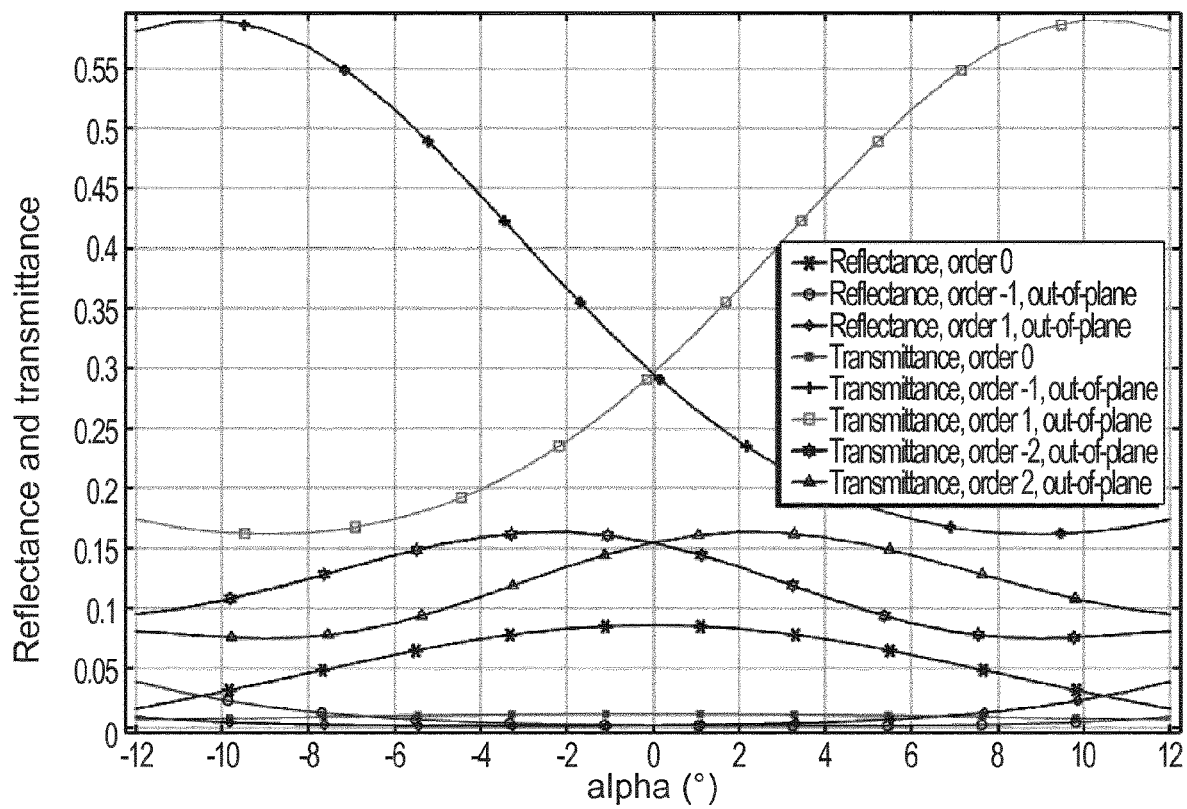
Figure 21:
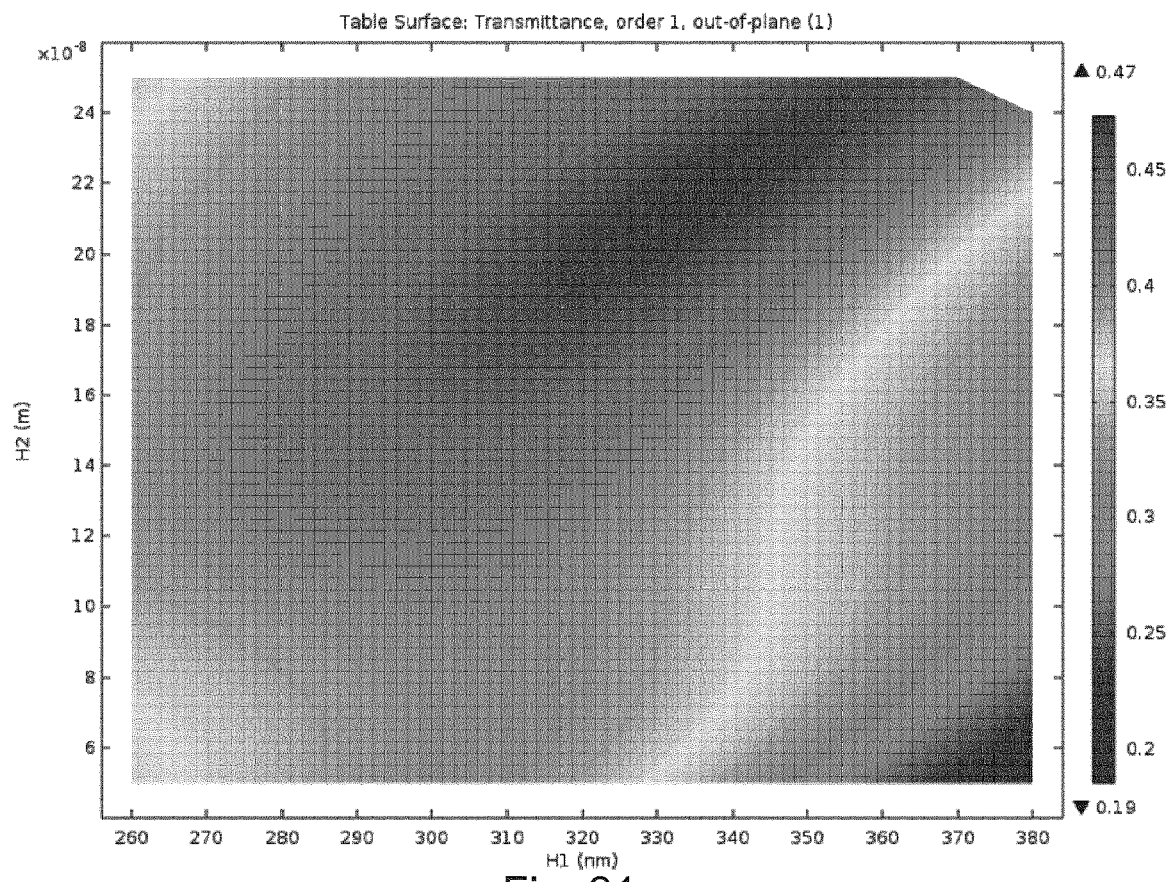
Figure 22:
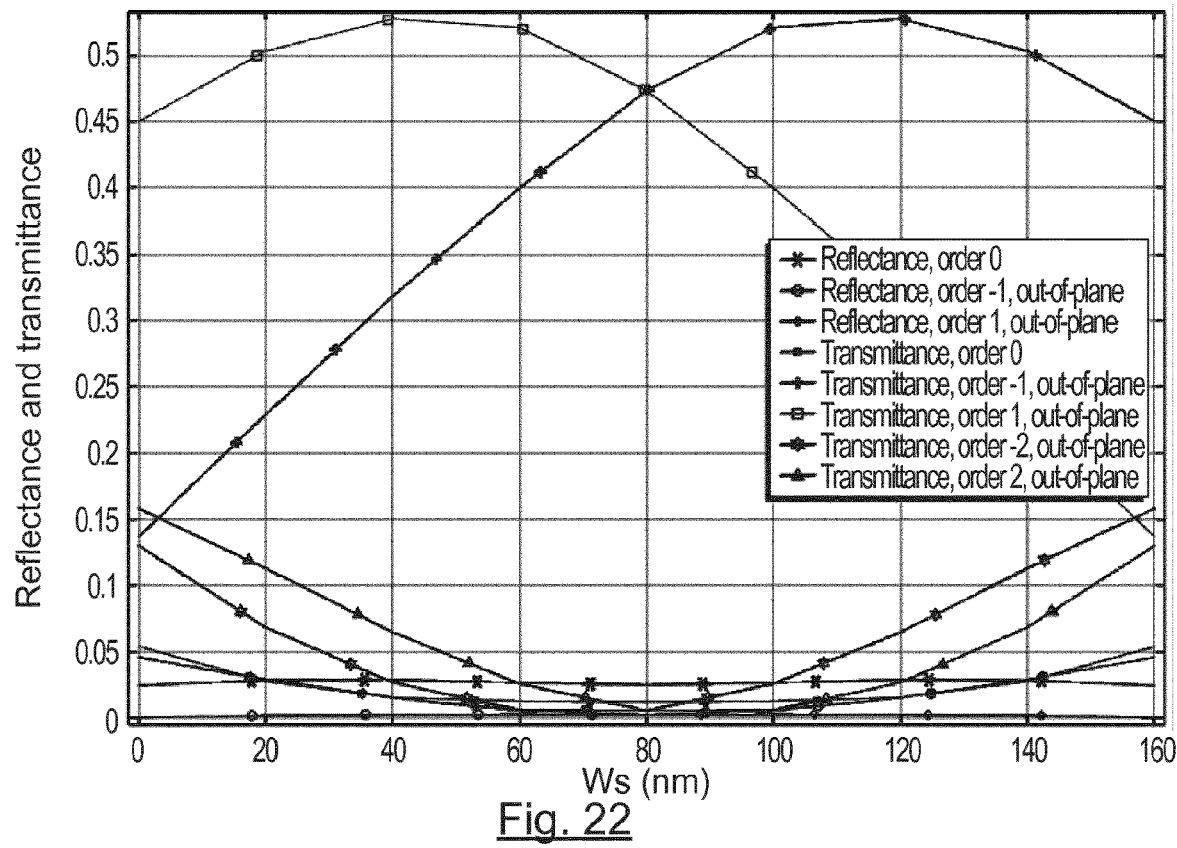

FIG. 15 presents schematic views of possible implementations of a microlens according to the proposed technique, with different size, form and position of the inserts and different shape of the main part, according to various embodiments of the disclosure;

FIG. 16 shows possible geometries of diffraction gratings, comprising inhomogeneous microlenses embedded into a dielectric medium, according to an embodiment of the disclosure;

FIG. 17 shows possible geometries of diffraction gratings, comprising a layer forming a substrate for inhomogeneous microlenses, according to an embodiment of the disclosure;

FIG. 18 shows possible geometries of diffraction gratings in 3D space, according to an embodiment of the disclosure;

FIG. 19 shows computed reflectance and transmittance as a function of the angle of incidence, for diffraction gratings geometries presented in relation with FIG. 16, according to an embodiment of the disclosure;

FIG. 20 shows computed reflectance and transmittance as a function of the angle of incidence, for diffraction gratings geometries presented in relation with FIG. 17, according to an embodiment of the disclosure;

FIG. 21 illustrates transmittance for $1^{st}$ diffraction order as a function of height of the microlenses and height of the insert, for normal incidence of electromagnetic wave on diffraction gratings having geometry presented in relation with FIG. 17(a), according to an embodiment of the disclosure;

FIG. 22 shows computed reflectance and transmittance as a function of a shift of an axis of symmetry of the insert relatively to an axis of symmetry of the main part of an inhomogeneous microlens, for normal incidence of electromagnetic wave on a diffraction gratings having geometry presented in relation with FIG. 17(a) but comprising non-symmetrical inhomogeneous microlens, according to an embodiment of the disclosure.

The components in the figures are not necessarily to scale, emphasis instead being placed upon illustrating the principles of the disclosure.

5. DETAILED DESCRIPTION

5.1 General Principle

There are a number of near-field focusing components enabling sub-wavelength resolution, which is of interest for many today and future nano-photonic applications. A photonic nanojet is a narrow high-intensity optical radiation flux formed in the proximity to the shadow surface of illuminated transparent dielectric symmetric bodies with a diameter comparable or somewhat larger than the wavelength of the incident optical radiation. The physical origin of photonic nanojet formation arises from the interference (both constructive and destructive) of the radiation net fluxes diffracted and passed through a particle (S.-C. Kong, A. Sahakian, A. Taflove, and V. Backman, "*Photonic nanojet-enabled optical data storage*," Opt. Express, Vol. 16, No. 18, 2008, Chen et al. "*Optical metrology using a photonic nanojet*," U.S. Pat. No. 7,394,535 B1, 2008, V. Pacheco-Pena, M. Beruete, I V. Minin, and O. V. Minin, "*Terajets produced by dielectric cuboids*," Applied Phys. Lett. Vol. 105, 084102, 2014, V. Pacheco-Pena, M. Beruete, I. V. Minin, and O. V. Minin, "*Multifrequency focusing and wide angular scanning of terajets*," Opt. Lett., vol. 40, no. 2, pp. 245-248, 2015).

A most striking and specific feature of photonic nanojet is the extremely high spatial localization of the light field in the transverse direction (relative to the direction of incidence), which, in contrast to the conventional focusing optics, can lead to the subwavelength dimensions of the photonic jet. The common interest to the nanojet effect is mostly caused by the promises of its practical application in nanophotonics, biology, medicine, and nanoelectronics. The principles of functioning of some devices are based on the fact that the nanojet can provide the high intensity of the electromagnetic field in a localized spatial region near a microparticle and has high sensitivity to the perturbations of both the field and material origin. Subject matter relating to controlled nanojet characteristics manipulation, such as the creation of thinner or longer and intensive nanojets by variation of microlens optical properties, thus attract a growing interest.

The general principle of the present disclosure relies on a new technical solution for the design of near-field and far-field focusing devices. As it will be described throughout the present disclosure, the proposed microlens device topology makes it possible to control focal spot position (e.g. nanojet beam deviation) and nanojet beam characteristics.

An additional advantage of the proposed topology lies in the anisotropic performance characteristics of the focusing element: indeed, the proposed microlens device provides non-reciprocal response, i.e. the characteristics of the generated nanojet beams depend on the side of incidence of the electromagnetic wave illuminating the device. In addition, by uniformly distributing a plurality of the proposed microlens devices within a dielectric host medium, it is possible to implement a far-field device, as it will be described later in the document, in relation with FIGS. 16 to 22.

According to an aspect of the disclosure, the proposed technique pertains to a new type of nanojet microlens, comprising a dielectric insert. It is proposed to combine two different dielectric materials—the material of a main part of the microlens and the material of the insert—in such a way that all the nanojet beams, originating from different lateral surfaces of steps of the microlens (lateral surfaces of the main part and lateral surfaces of the insert) of the inhomogeneous microlens, recombine and contribute to the formation of at least two nanojet beams located out of an axis of symmetry of the microlens main part.

As schematically shown in FIGS. 1a to 1e, such a desired effect can be achieved for a system combining two or more elements having different refractive indexes that meet specific criteria, as discussed further below in the present disclosure.

A step of an element (main part or insert) is formed by a surface of the element having at least one abrupt change of refractive index. For example, in FIGS. 1a to 1d and 1f, a step is formed on each side of the main part by a bottom surface and a lateral surface of the main part, the bottom surface being defined with respect to an arrival direction of the electromagnetic wave. As step is also formed on each side of the insert by a bottom surface and a lateral surface of the insert.

The characteristics of the generated nanojet beams can notably be controlled by adjusting the parameters of the constitutive parts of the proposed microlens (i.e. refractive index ratios between the main part of the lens, insert and host medium surrounding the microlens, size and shape of the constitutive parts, and position of the insert). Moreover, the system may be designed to be anisotropic, leading to the dependence of the response of the proposed microlens on the side of electromagnetic wave incidence.

Figure 1A:
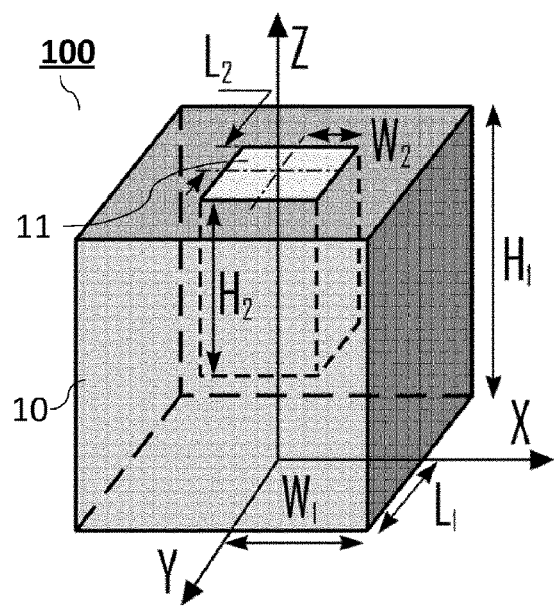
FIG. 1a illustrates an exemplary topology of an inhomogeneous microlens with an insert according to an embodiment of the present disclosure.

FIG. 1a illustrates a general topology of an inhomogeneous nanojet microlens (100) according to an embodiment of the proposed technique. Such an inhomogeneous nanojet microlens (100) is an optically transparent device comprising a main part (10) of dielectric material and an insert (11) of dielectric material, the insert (11) being inserted in the main part (10) of the microlens (100). In the example shown on FIG. 1a, the main part of the microlens and the insert are cuboid, and the top surface of the insert coincides with the top surface of the microlens.

Dimensions of the constitutive parts of the constitutive parts of the microlens are as follows:
- $H_1$ and $H_2$ represent respectively the height of the microlens and of the insert along the z-axis represented on FIG. 1a;
- $W_1$ and $W_2$ represent respectively the half-width of the microlens and of the insert along the x-axis represented on FIG. 1a;
- $L_1$ and $L_2$ represent respectively the half-length of the microlens and of the insert along the y-axis represented on FIG. 1a.

The proposed microlens device is configured for forming a field intensity distribution in a near zone of said device, from electromagnetic waves incidentally illuminating said device, when this device is embedded in a dielectric material having a refractive index $n_1$ lower than the refractive index $n_2$ of the dielectric material of the main part (10). In addition, the microlens is designed so that the dielectric insert (11) has a refractive index $n_3$ lower than the refractive index $n_2$ of the dielectric material of the main part (10), and different from refractive index $n_1$. The width of the main part and the width the insert are also configured so that $W_1 - W_2 \geq \lambda/2$ and $2W_1 \leq 10\lambda$, $\lambda$ being the wavelength of electromagnetic waves incidentally illuminating the device, in the material of said main part (in other words, the dimensions of the microlens should not exceed few wavelengths so as to limit Fresnel diffraction phenomenon). Those constraints on refractive indexes $n_1$, $n_2$ and $n_3$ (i.e. $n_3 < n_2$ $n_1 < n_2$; $n_3 \neq n_1$) and on dimensions are assumed to be respected in all the described embodiments of the proposed technique, and lead to the generation of at least two nanojet beams located out of the axis of symmetry of the microlens main part. Those nanojet beams are formed at focal positions $(R_{fL}, H_{fL})$ and $(R_{fR}, H_{fR})$, as shown in FIGS. 1b and 1c, where $R_{fL}$ and $R_{fR}$ represent the distance of said focal positions from an axis of symmetry of the main part of the microlens, and $H_{fL}$ and $H_{fR}$ represent the distance of said focal positions from the bottom surface of the microlens.

Figure 1B:
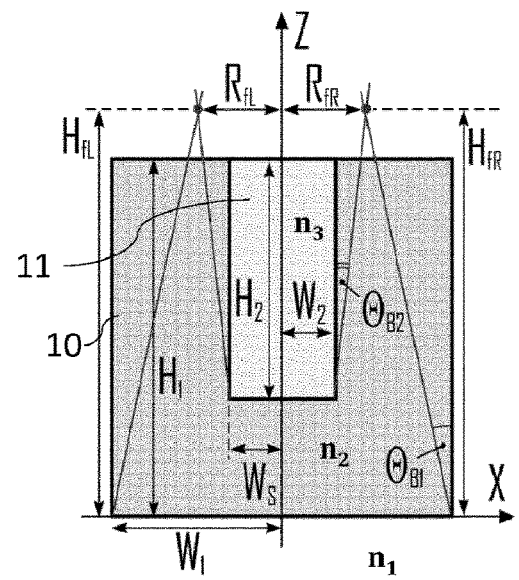
FIG. 1b illustrates a cross-section view of a symmetrical inhomogeneous microlens with an insert according to an embodiment of the present disclosure.
Figure 1C:
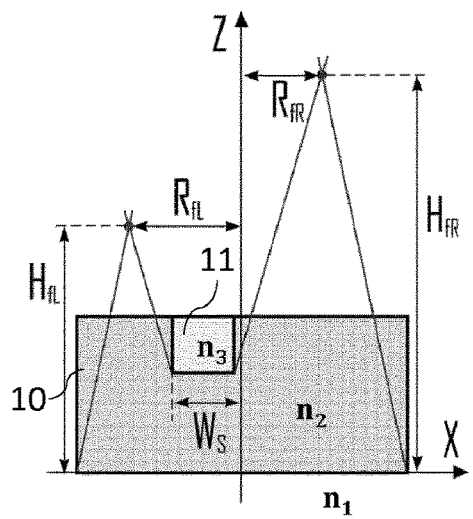
FIG. 1c illustrates a cross-section view of a non-symmetrical inhomogeneous microlens with an insert according to an embodiment of the present disclosure.

FIGS. 1b and 1c illustrate cross-section views of an inhomogeneous microlens comprising an insert, according to different embodiments of the proposed technique. More particularly, FIG. 1b is a cross-section view of a symmetrical inhomogeneous microlens, i.e. the microlens and the insert share a same axis of symmetry parallel to the z-axis. FIG. 1c is a cross-section view of a non-symmetrical inhomogeneous microlens, i.e. the microlens and the insert do not share a same axis of symmetry.

Figure 1F:
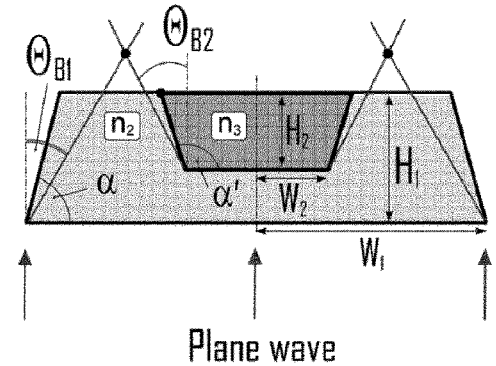
FIG. 1f illustrates a cross-section view of an inhomogeneous microlens with an insert according to another embodiment of the present disclosure.
Figure 1D:
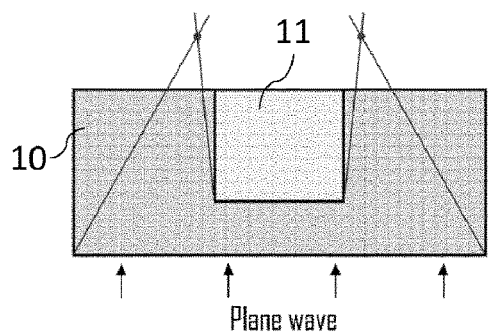
FIGS. 1d and 1e illustrate cross-section views of an inhomogeneous microlens according to an embodiment of the present disclosure, illuminated by an electromagnetic plane wave respectively from the bottom (FIG. 1d) and from the top (FIG. 1e) of the microlens, according to an embodiment of the disclosure.
Figure 1E:
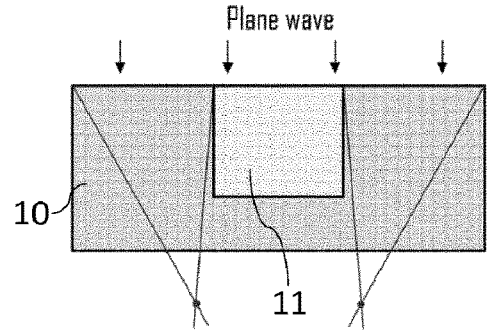

Other shapes for microlens and insert than those illustrated in FIGS. 1a, 1b and 1c are also possible. For example, the cross-section views in FIG. 1b or 1c may correspond to a rib, a cuboid, a cylinder or a prism embedded in a homogeneous dielectric host media having a refractive index $n_1$ lower than the refractive index $n_2$ of the main part of the microlens (the microlens comprising itself a dielectric insert with a refractive index $n_3$ lower than the refractive index $n_2$ of the main part, and different from refractive index $n_1$). The material and size of the insert with refractive index $n_3$ can be selected arbitrary and optimized depending on the parameters of main part, in order to change the position of generated nanojet hot spots in a space of the host medium above the surface of the microlens, as a result of recombination of the nanojet beams associated with the edges of the microlens constitutive parts. The total response of such system depends on the side of plane wave illumination. More particularly, as it is shown in relation with FIG. 2 described further below, the power density distribution of the generated beams differs depending on whether the microlens is illuminated from bottom (as illustrated in FIG. 1d) or from top (as illustrated in FIG. 1e). The incident electromagnetic wave may have, for example, a wavelength which is comprised in the range 390 nm to 700 nm.

The effect of the size, position and refractive index of the insert for such type of microlens on the nanojets hot spot position, hot spot deviation, and near field pattern is investigated here below. More particularly, performances of the proposed inhomogeneous microlens with insert are evaluated numerically via full-wave electromagnetic analysis of an inhomogeneous microlens in a form of a cuboid, such as the one whose cross-section is represented in FIG. 1b or 1c. For simplicity, it is assumed that all the materials are lossless and non-dispersive. In the illustrative embodiments, the position of the top edge of insert is fixed to coincide with the position of the top edge of the main part of the microlens. However other topology could be used, provided that the top edge of the insert is not higher than the top edge of the main part. For simplification, only the cases where the top edges of constitutive parts (main part and insert) coincide, and where the height of the insert is equal or lower than the total height of the microlens, are numerically investigated here. The structure may have vertical lateral surfaces parallel to z-axis and top/bottom surface parallel to xy-plane, which corresponds to a base angle α equal to 90 degree. However, some other structures (with arbitrary base angles) can also be used, as described later in the document in relation with FIG. 1f. Indeed, variation of the base angle value provides additional degree of freedom in the control of the nanojet beam radiation direction.

In an approximation, the focal length of the nanojet microlens with the insert can be characterized as a function of the size (width or radius) and index ratio of the media inside and outside the microstructure. A set of equations that make it possible to estimate the hot spot position for the nanojets generated by the system with $n_3 < n_2 > n_1$ is now presented. It is demonstrated that for the proposed ratio between the refractive indexes of constitutive parts for the symmetrical systems, and with $W_1 - W_2 \geq \lambda/2$ ($\lambda$ being the wavelength of incident wave), at least two nanojet hot spots may be obtained. Near-field pattern and position of nanojet hot spots are determined by the form, size, position regarding the main part and values of refractive index of an insert. Such an effect is explained by the interference of the nanojet beams associated with the bottom edge of the main part of microlens with the nanojet beams associated with the bottom edge of the insert (considering the case of an electromagnetic wave incidence from the bottom of the microlens). The intersection of the nanojets associated with the edges of the different constitutive parts of the system leads to the forming of the hot spots located out of the axis of symmetry of the microlens main part. The total response of the inhomogeneous systems with dimensions larger than few wavelengths of an incident wave represents the interplay between the nanojet and Fresnel diffraction phenomenon.

The beam-forming phenomenon is associated solely with the edge of the system and the nanojet beam radiation angle is defined by the Snell's low. The nanojet beam radiation angle for constitutive parts of microlens can thus be determined as a function of the ratio between the refractive indexes of the host media and material of the main part of the lens (as for the insert, it is assumed that the host medium is the material of the main part of microlens), and the base angle of the element. At first, for the sake of simplicity, only elements with vertical lateral surfaces are analyzed, and the base angle is thus considered equal to 90°. For the main part of the microlens with refractive index $n_2$ the nanojet beam radiation angle $\Theta_{B1}$ (as shown in FIG. 1b for example) can be determined using the approximate formula:

$$\Theta_{B1} \approx \frac{90° - \Theta_{TIR1}}{2}, \text{ where } \Theta_{TIR1} = \sin^{-1}\left(\frac{n_1}{n_2}\right) \quad (1)$$

is the critical angle of refraction.

The focal length of the lens can be estimated as:

$$F_L = W_1 \gamma_1, \text{ where } \gamma_1 = \frac{1}{\tan\Theta_{B1}}, \quad (2)$$

$W_1$ is the half-width (radius) of the main part of microlens (see FIG. 1b).

Considering a symmetrical inhomogeneous microlens with the insert for which $n_3 < n_2 > n_1$, the nanojet hot spot/focal points will be positioned out of the axis of symmetry of microlens, as illustrated in FIG. 1b. Moreover, at least two (depending on a geometry) nanojet hot spots symmetrically situated relative to the axis of symmetry are observed. The approximate formulas to determine the position of focal points have the form:

$$R_{fL} = R_{fR} = R_f \approx \frac{\tan\Theta_{B2}W_1 + \tan\Theta_{B1}\tan\Theta_{B2}(H_2 - H_1) + \tan\Theta_{B1}W_2}{\tan\Theta_{B1} + \tan\Theta_{B2}}, \quad (3)$$

$$H_{fL} = H_{fR} = H_f \approx \frac{W_1 - R_f}{\tan\Theta_{B1}}.$$

where $W_2$ is the half-width (radius) of the insert, $H_1$ and $H_2$ are respectively the heights of a microlens and an insert (see FIG. 1b), $$\gamma_2 = \frac{1}{\tan\Theta_{B2}}, \Theta_{B2} \approx \frac{90° - \Theta_{TIR2}}{2}, \Theta_{TIR2} = \sin^{-1}\left(\frac{n_3}{n_2}\right).$$

It is necessary to note, that if $H_1 \neq H_2$, the total response of the system depends on the side of electromagnetic wave incidence. It relates to the different position of the edge of insert regarding edge of main element (see schematic view of FIGS. 1d and 1e showing two different sides of incidence). So, such type of elements can be called anisotropic nanojet microlenses. In the case of electromagnetic wave incidence from the top of the microlens, the position of focal points is independent on the heights $H_1$ and $H_2$:

$$R_{fL}^* = R_{fR}^* = R_f^* \approx \frac{\tan\Theta_{B2}W_1 + \tan\Theta_{B1}W_2}{\tan\Theta_{B1} + \tan\Theta_{B2}}, \quad (4)$$

$$H_{fL}^* = H_{fR}^* = H_f^* \approx \frac{W_1 - R_f^*}{\tan\Theta_{B1}}.$$

To get the maximal intensity of nanojet hot spots, a design rule consists in taking the elements for which the total height is close to the focal length $H_f$ or $H_f^*$ ($H_1 \rightarrow H_f^*$, for example).

At the same time, it can be demonstrated that the form and intensity of generated nanojets are sensitive to the values of parameters $L_1$ and $L_2$. To intensify the total generated nanojets, the input from the nanojets generated by the edges which are perpendicular to the y-axis should be taken into account.

For the case of non-symmetrical system with the insert (such as the one illustrated in relation with FIG. 1c), the following approximate formulas are obtained to determine the position of focal points for bottom electromagnetic wave incidence:

$$R_{fL} \approx \frac{\tan\Theta_{B2}W_1 + \tan\Theta_{B1}\tan\Theta_{B2}(H_2 - H_1) + \tan\Theta_{B1}W_s}{\tan\Theta_{B1} + \tan\Theta_{B2}}, \quad (5)$$

$$R_{fR} \approx \frac{\tan\Theta_{B2}W_1 + \tan\Theta_{B1}\tan\Theta_{B2}(H_2 - H_1) + \tan\Theta_{B1}(2W_2 - W_s)}{\tan\Theta_{B1} + \tan\Theta_{B2}},$$

$$H_{fL} \approx \frac{W_1 - R_{fL}}{\tan\Theta_{B1}}, H_{fR} \approx \frac{W_1 - R_{fR}}{\tan\Theta_{B1}}.$$

Here $W_s$ is a position of the left edge of the insert regarding the axis of the symmetry for main constitutive part of the microlens (see FIG. 1b) and $W_1-W_s \geq \lambda/2$. In the case of electromagnetic wave incidence from the top of the microlens, the position of focal points is determined as:

$$R_{fL}^* \approx \frac{\tan\Theta_{B2} W_1 + \tan\Theta_{B1} W_s}{\tan\Theta_{B1} + \tan\Theta_{B2}}, \quad R_{fR}^* \approx \frac{\tan\Theta_{B2} W_1 + \tan\Theta_{B1}(2W_2 - W_s)}{\tan\Theta_{B1} + \tan\Theta_{B2}}, \quad (6)$$

$$H_{fL}^* \approx \frac{W_1 - R_{fL}^*}{\tan\Theta_{B1}}, \quad H_{fR}^* \approx \frac{W_1 - R_{fR}^*}{\tan\Theta_{B1}}.$$

In such a non-symmetrical system, the non-equality of the focal point distance from the axis of the symmetry and from the surface of the microlens is observed.

In the embodiments disclosed above, it has been considered that the main part of the microlens and the insert have vertical lateral surfaces, that is surfaces parallel to the z-axis.

According to another embodiment, a structure with non-vertical lateral surfaces and top/bottom surface parallel to xy-plane is now considered. Thus, the base angle of the structure is no more 90°. Let us assume that α is the base angle for the main part of the microlens and α' is the base angle for the insert, as shown in FIG. 1f illustrating a cross-section view of an inhomogeneous microlens with an insert. This cross-section view may correspond to a prismatic or a cone system embedded in a homogeneous dielectric host media with a refractive index $n_1 < n_2$.

It was obtained that for the systems with non-vertical edges, the nanojets beam radiation angle can be determined using the approximate formula:

$$\Theta_{B1} \approx \frac{90° - \Theta'_{TIR1}}{2},$$

where $\Theta'_{TIR1}$ is the critical angle of refraction from the non vertical edge. To get the approximate formula for $\Theta'_{TIR1}$, the changing of the position of the edge has to be taken into account. As a result, the nanojets beam radiation angle can be estimated for the main part as:

$$\Theta_{B1} \approx 90° - \frac{\Theta_{TIR1} + \alpha}{2}.$$

In a similar way, the nanojets beam radiation angle for the insert can be determined as:

$$\Theta_{B2} \approx \frac{90° - \Theta'_{TIR2}}{2}$$

where $\Theta'_{TIR2}$ is the critical angle of refraction from the non-vertical edge of the insert.

The nanojets beam radiation angle for the insert can thus be estimated as:

$$\Theta_{B2} \approx 90° - \frac{\Theta_{TIR2} + \alpha'}{2}$$

where α' is the base angle for the insert, which is different from 90° in this embodiment.

Thus, for microlenses having structures with non-vertical lateral surfaces, the position of focal points can thus be obtained by using the above estimation of the nanojets beam radiation angle for the main part and the insert in equations (3), (4), (5) or (6).

5.2 Simulation Results

The electromagnetic field simulation software package CST MICROWAVE STUDIO is now used to simulate different embodiments of the proposed inhomogeneous microlens, and to analyse the data obtained. The microlens (100) is assumed to be in a form of cuboid with the dielectric insert (11) of the same form, and is illuminated by a linearly-polarized plane wave E={0,1,0}. All presented simulations were done for 3D problem.

5.2.1 Symmetrical System

Some simulation results for symmetrical inhomogeneous microlens as illustrated for example in FIG. 1b, that is system where the insert and the microlens share a same axis of symmetry parallel to the z-axis, are now presented. The response of the system when varying various parameters one at a time is studied.

Dependence on the Height of the Insert

Figure 2:
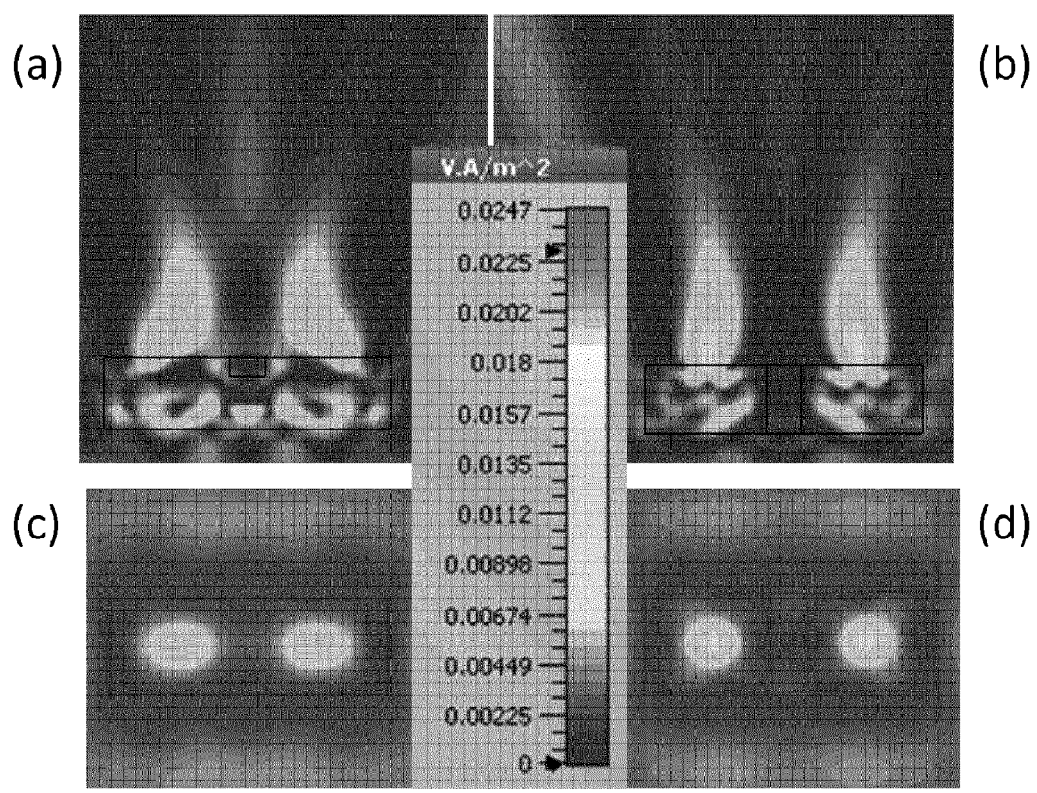
FIG. 2 illustrates how the height of the insert impacts the power density distribution of the nanojet beams generated by an inhomogeneous microlens, according to an embodiment of the disclosure.

FIG. 2 illustrates power density distribution in the xz-plane (images (a) and (b)) and xy-plane (images (c) and (d)) of the nanojets generated by illuminating from bottom a symmetrical inhomogeneous microlens by a plane wave at λ=550 nm (wavelength). The microlens has the following characteristics: $n_1$=1, $n_2$=2, $n_3$=1.3, $W_1$=800 nm, $L_1$=$L_2$=275 nm, $H_1$=400 nm, $W_2$=100 nm. Images (a) and (c) correspond to a height of the insert equal to 100 nm ($H_2$=100 nm). Images (b) and (d) correspond to a height of the insert equal to 400 nm ($H_2$=$H_1$=400 nm). Two symmetrical focal spots are produced. As it can be observed by comparing images (a) and (c) on one hand and images (b) and (d) on the other hand, the height of the insert affects the form of the nanojets and the position of the nanojets hot spots.

Dependence on the Side of the Electromagnetic Wave Incidence

Figure 3:
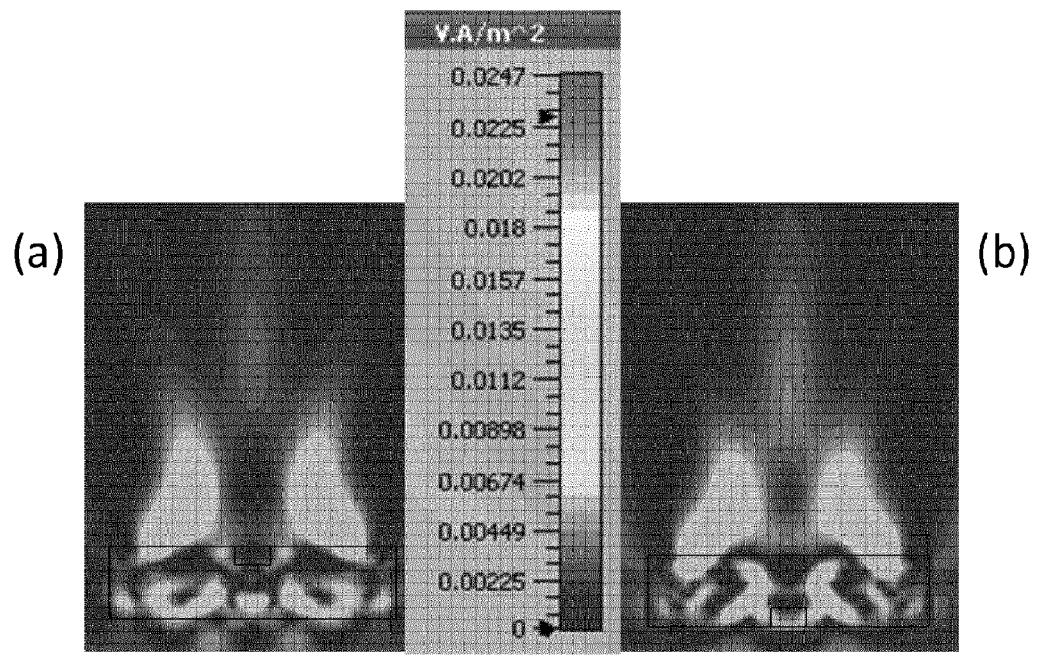
FIG. 3 illustrates how the side of electromagnetic wave incidence impacts the power density distribution of the nanojet beams generated by an inhomogeneous microlens, according to an embodiment of the disclosure.

FIG. 3 shows the power density distribution in the xz-plane for nanojet beams produced by inhomogeneous microlens with $n_1$=1, $n_2$=2, $n_3$=1.3, $W_1$=800 nm, $L_1$=$L_2$=275 nm, $H_1$=400 nm, $W_2$=100 nm, $H_2$=100 nm and illuminated from the bottom (image (a)) and from the top (image (b)) by a plane wave at λ=550 nm. Image (b) has been rotated by 180° to allow comparison with image (a). It can be observed that even for small-height inserts the total response of the system depends on the side of electromagnetic wave incidence.

Figure 4:
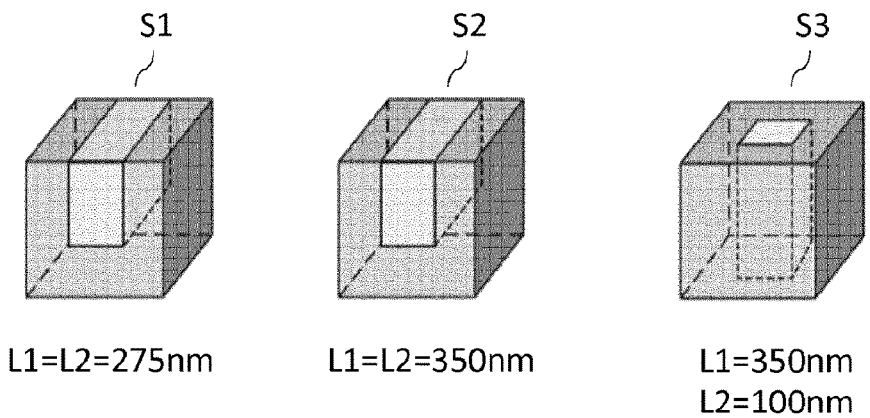
FIG. 4 illustrates three simulated exemplary topologies of an inhomogeneous microlens with an insert according to an embodiment of the present disclosure.

Dependence on the Height of the Insert for Different Sides of the Electromagnetic Wave Incidence FIG. 4 shows various simulated topology of the inhomogeneous microlens:
  a first simulated topology S1 with $L_1$=$L_2$=275 nm;
  a second simulated topology S2 with $L_1$=$L_2$=350 nm;
  a third simulated topology S3 with $L_1$=350 nm and $L_2$=100 nm.

For each of the simulated topology S1, S2 and S3, FIGS. 4a, 4b, 4c, 5a, 5b and 5c show evolution of position and power density of generated nanojet hot spot as a function of the height $H_2$ of the insert (the other parameters of the microlens remaining constant: $n_1$=1, $n_2$=2, $n_3$=1.3, $W_1$=800 nm, $W_2$=100 nm, $H_1$=400 nm).

Figure 4A:
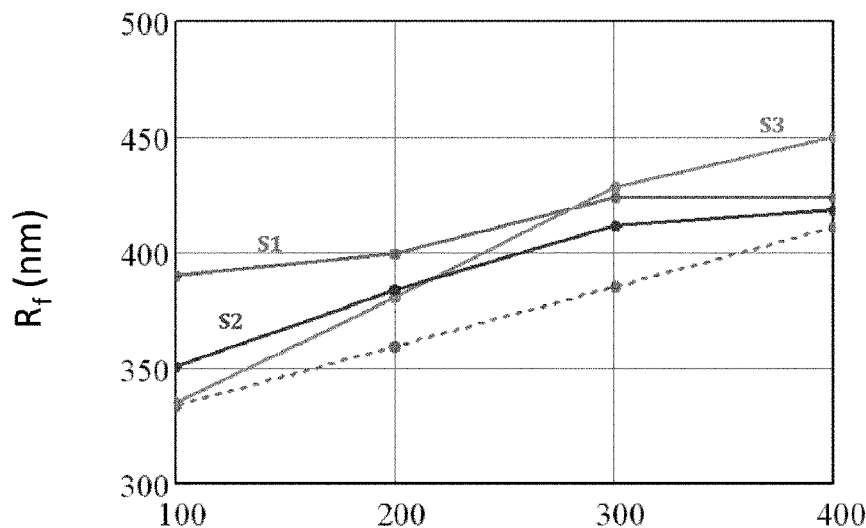
FIGS. 4a, 4b and 4c illustrate how position of nanojet hot spot (FIGS. 4a and 4b) and power density of nanojet beam at hot spot (FIG. 4c) vary as a function of the height of an insert for each of the three simulated exemplary topologies of FIG. 4, when the system is illuminated by a plane wave incident from the bottom of the microlens, according to an embodiment of the disclosure.
Figure 4B:
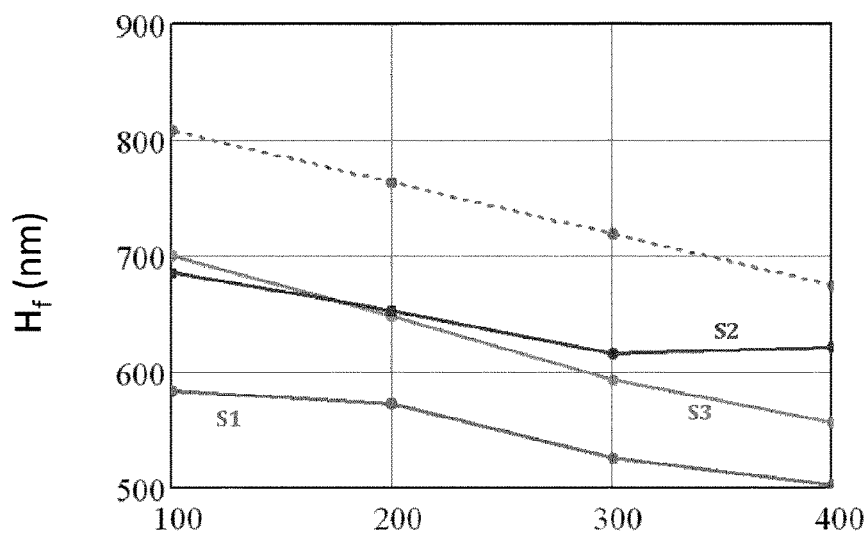
Figure 4C:
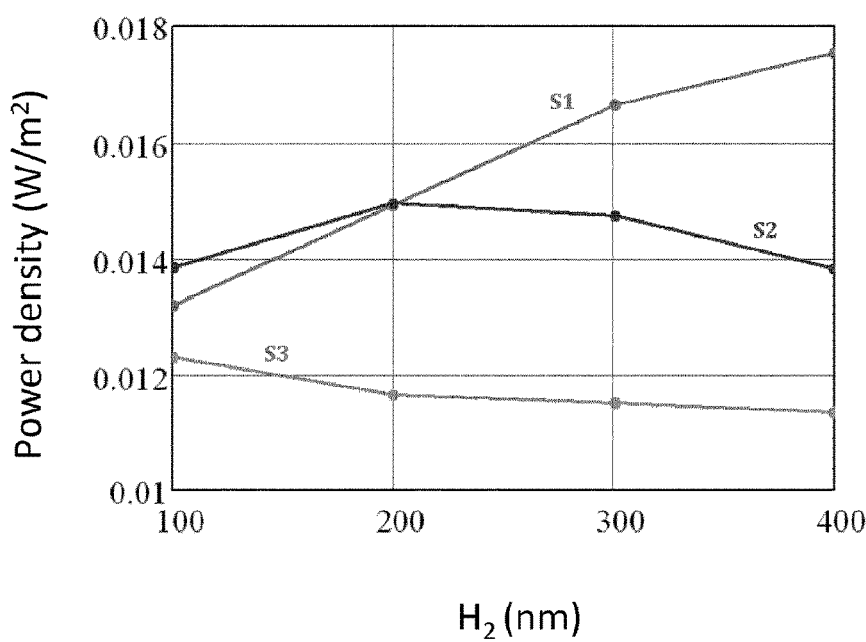
Figure 5A:
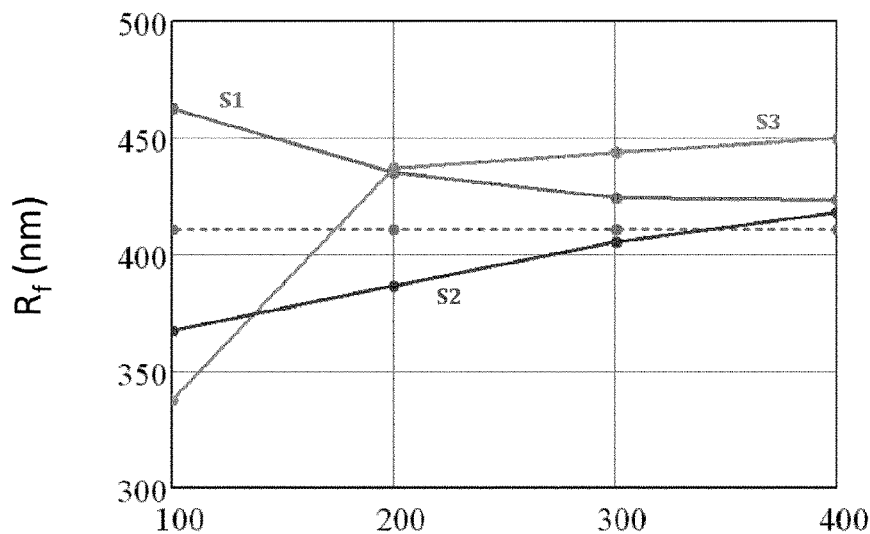
FIGS. 5a, 5b and 5c illustrate how position of nanojet hot spot (FIGS. 5a and 5b) and power density of nanojet beam at hot spot (FIG. 5c) vary as a function of the height of an insert for each of the three simulated exemplary topologies of FIG. 4, when the system is illuminated by a plane wave incident from the top of the microlens, according to an embodiment of the disclosure.
Figure 5B:
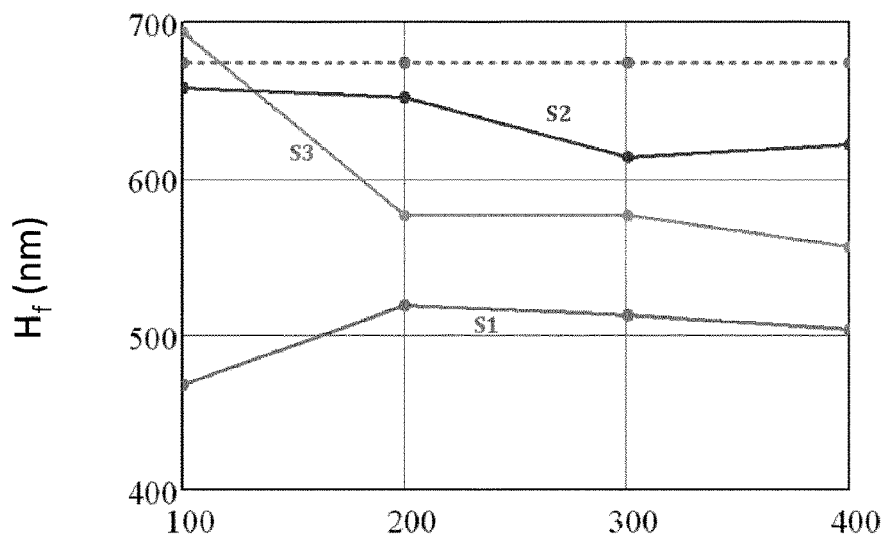
Figure 5C:
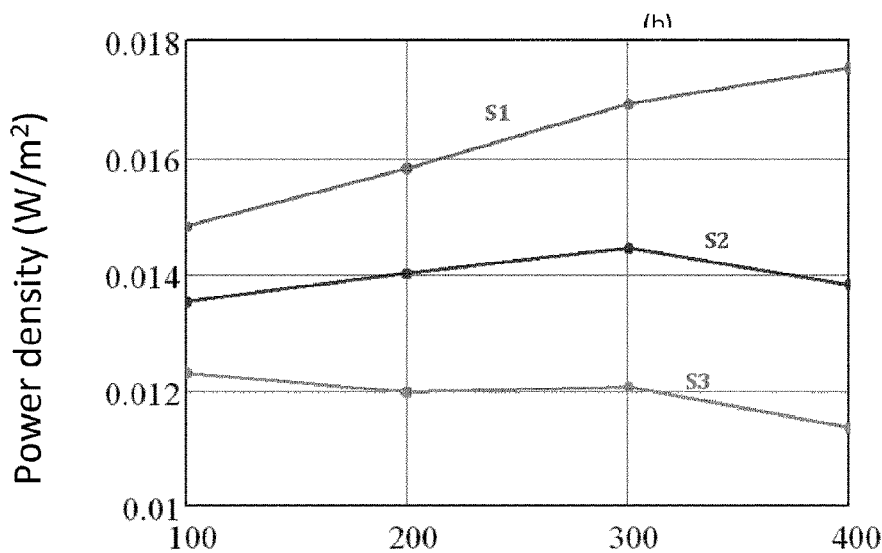

More particularly, FIGS. 4a, 4b and 4c correspond to the case where the microlens is illuminated by a plane wave at λ=550 nm incident from the bottom of the microlens, whereas FIGS. 5a, 5b and 5c correspond to the case where the microlens is illuminated by a plane wave at λ=550 nm incident from the top of the microlens. Dashed grey lines correspond to the dependences obtained from the approximate formulas.

Evaluating the dependencies of the position and power density of nanojet hot spot on the sizes of the inserts, it can be observed high sensitivity of the system to the size of the microlens and insert along y-direction and to the side of electromagnetic wave incidence. As it was predicted by the equation (3) for the case of bottom incidence, $R_f$ decreases and $H_f$ increases with the heights of the insert (see FIGS. 4a and 4b). From the numerical data, one can conclude that the properties of inhomogeneous microlens with top plane wave incidence (FIGS. 5a, 5b and 5c) are less sensitive to the height $H_2$ of the insert compared to the properties of the system in the case of bottom wave incidence (FIGS. 4a, 4b and 4c). The reference solutions obtained using equations (3) and (4) are marked by dashed grey line. The deviation from the theoretically predicted position of the nanojet hot spots is related to the sizes of the constitutive parts in y-axis direction. It should also be noted that increasing the height of the insert makes it possible to increase the discrepancy between the power densities in the hot spots for presented topologies S1, S2 and S3. As it can also be seen in FIGS. 5a and 5b, the highest hot spot position discrepancy for presented topologies corresponds to the smallest height $H_2$.

Dependence on the Width of the Insert

Figure 6A:
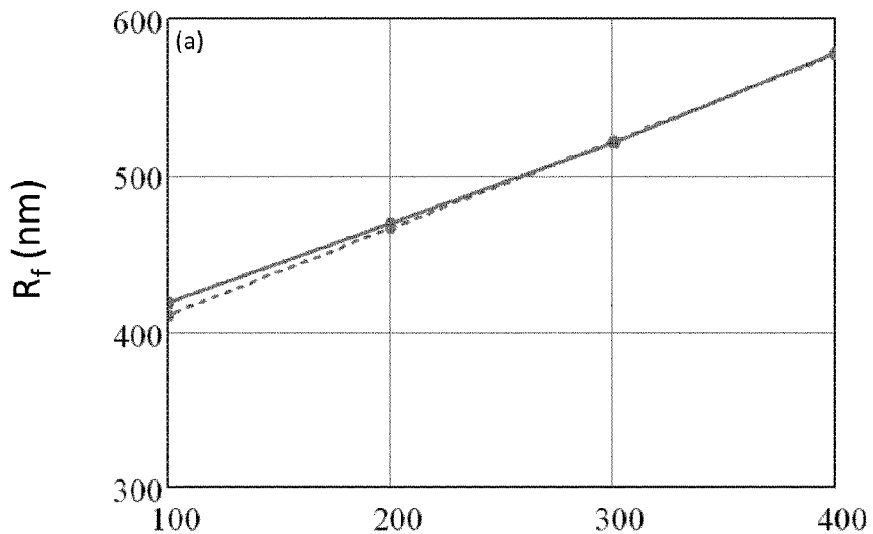
FIGS. 6a, 6b and 6c illustrate how position of nanojet hot spot (FIGS. 6a and 6b) and power density of nanojet beam at hot spot (FIG. 6c) vary as a function of the width of an insert of an inhomogeneous microlens, according to an embodiment of the disclosure.
Figure 6B:
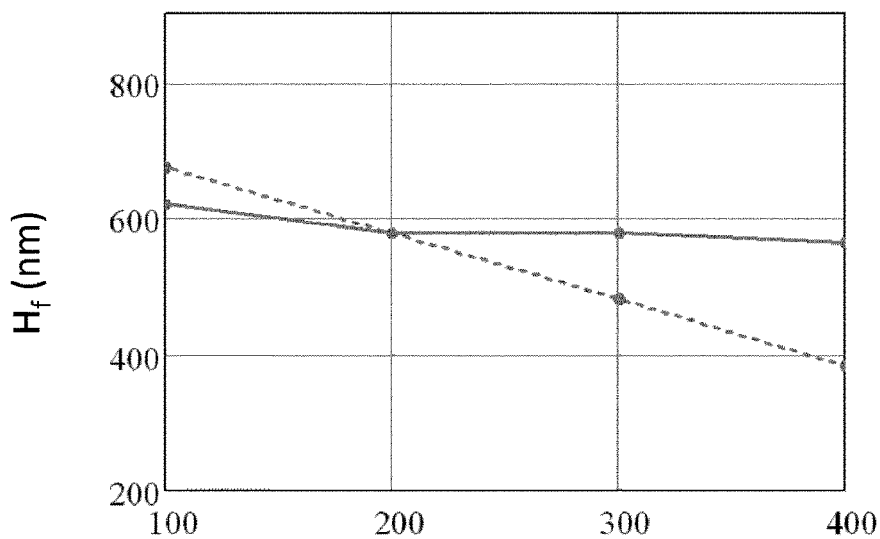
Figure 6C:
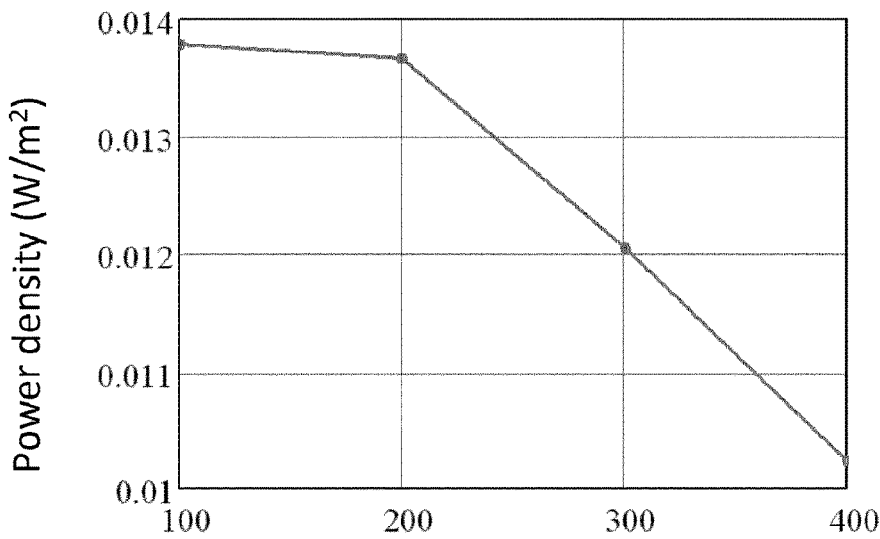

FIGS. 6a, 6b and 6c shows the variation of hot spot position (FIGS. 6a and 6b) and power density (FIG. 6c) as a function of the width $W_2$ of the insert, for a inhomogeneous microlens with $H_1=H_2$ (it is obvious that the response for such topology is independent on the side of electromagnetic wave incidence). More particularly, following parameters are used for the simulation: $n_1=1$, $n_2=2$, $n_3=1.3$, $W_1=800$ nm, $H_1=H_2=400$ nm, $L_1=L_2=350$ nm, illumination by a plane wave at wavelength λ=550 nm. Dashed grey lines correspond to dependences obtained from the approximate formulas. Solid lines are the results of CST simulations For such type of topology, a very good coincidence between simulated and analytically calculated results can be observed for $R_f$. As it can be noted, by increasing $W_2$, one can increase deviation from the axis of the symmetry ($R_f$) and decrease $H_f$, and the intensity of nanojet beam decreases with the width of an insert.

Similar dependencies are obtained for the systems with fixed width of the inserts and changing sizes of the main part.

Dependence on the Height of the Microlens

Figure 7A:
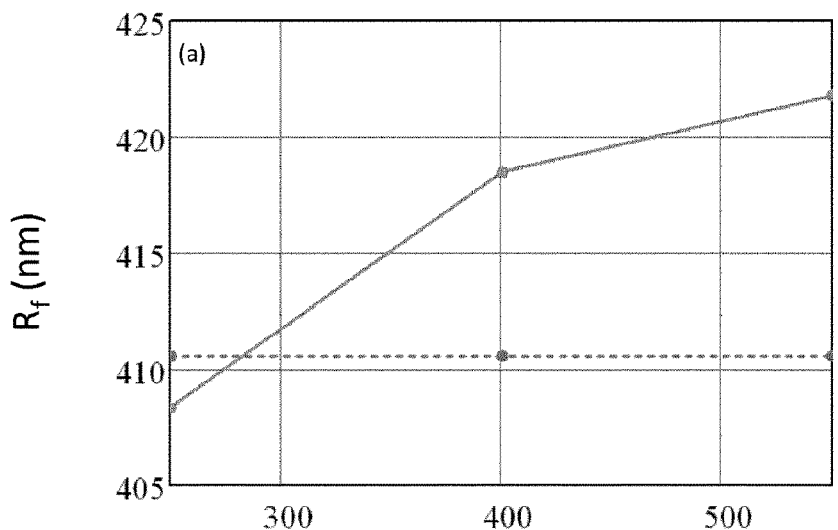
FIGS. 7a, 7b and 7c illustrate how position of nanojet hot spot (FIGS. 7a and 7b) and power density of nanojet beam at hot spot (FIG. 7c) vary as a function of the height of an inhomogeneous microlens, according to an embodiment of the disclosure.
Figure 7B:
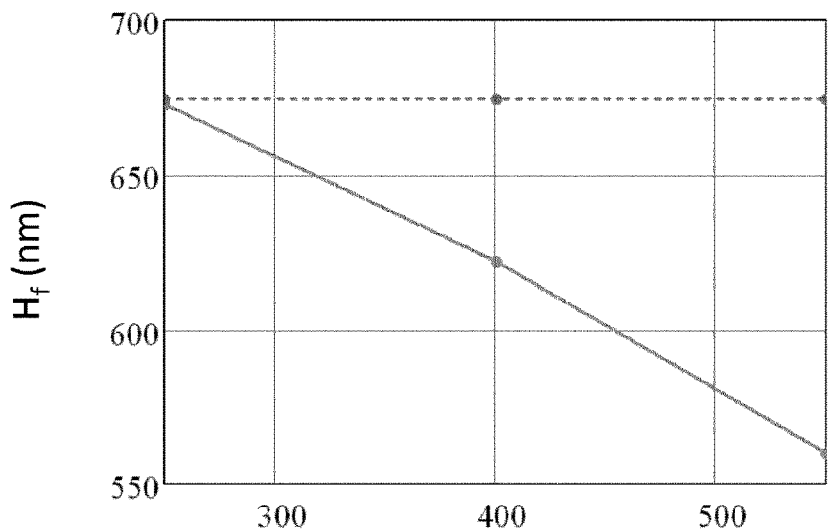
Figure 7C:
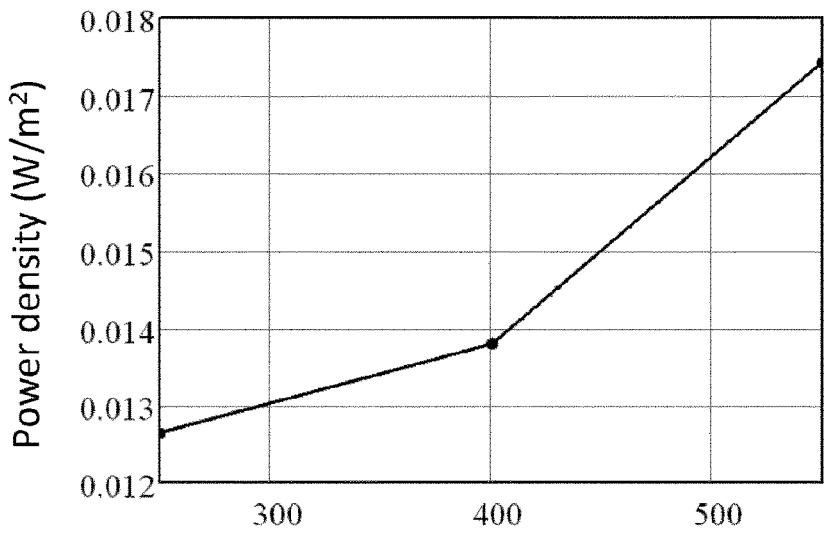

FIGS. 7a, 7b and 7c show the variation of hot spot position (FIGS. 7a and 7b) and power density (FIG. 7c) as a function of the total height $H_1$ of the microlens, for a inhomogeneous microlens with $H_1=H_2$. More particularly, following parameters are used for the simulation: $n_1=1$, $n_2=2$, $n_3=1.3$, $W_1=800$ nm, $L_1=L_2=350$ nm, illumination by a plane wave at wavelength λ=550 nm. Dashed grey lines correspond to dependences obtained from the approximate formulas. Solid lines are the results of CST simulations.

Based on numerical simulations, it can be observed that for the presented topology $R_f$ increases and $H_f$ decreases when $H_1$ increases.

Dependence on the Width of the Microlens

Figure 8A:
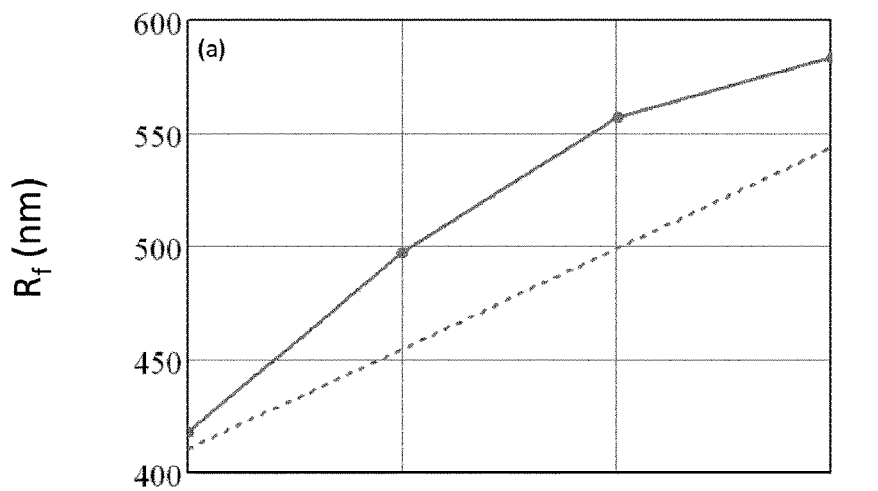
FIGS. 8a, 8b and 8c illustrate how position of nanojet hot spot (FIGS. 8a and 8b) and power density of nanojet beam at hot spot (FIG. 8c) vary as a function of the width of an inhomogeneous microlens, according to an embodiment of the disclosure.
Figure 8B:
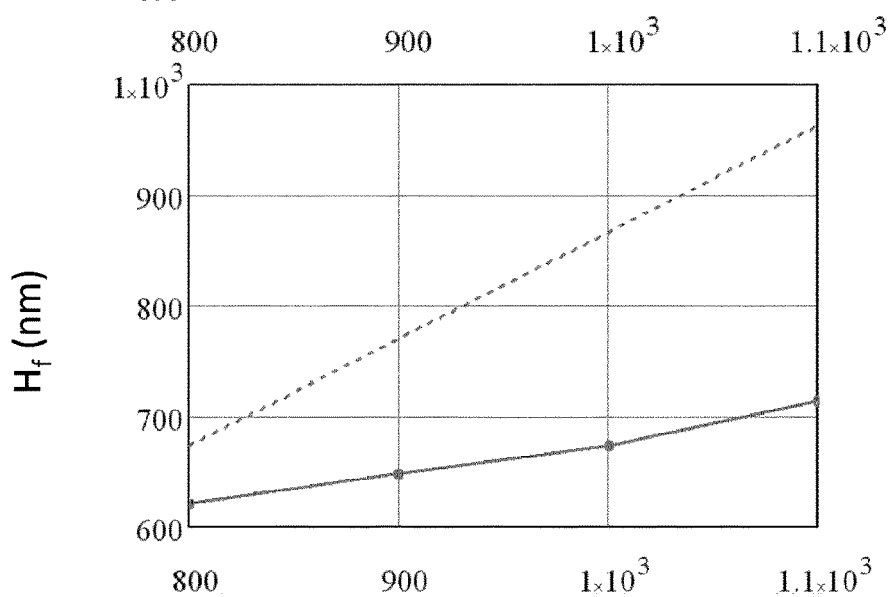
Figure 8C:
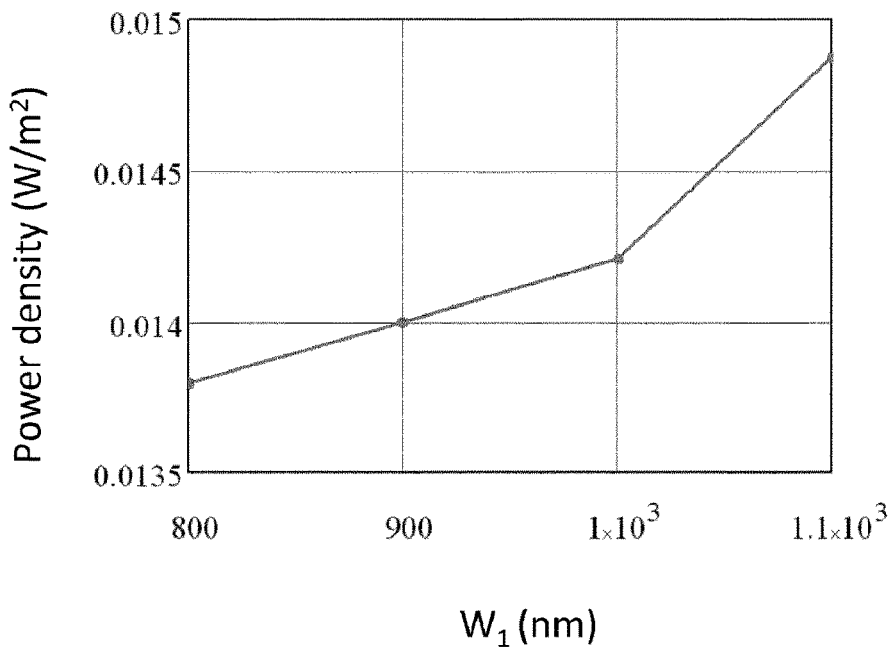

FIGS. 8a, 8b and 8c shows the variation of hot spot position (FIGS. 8a and 8b) and power density (FIG. 8c) as a function of the total width $W_1$ of the microlens, for a inhomogeneous microlens with $H_1=H_2$. More particularly, following parameters are used for the simulation: $n_1=1$, $n_2=2$, $n_3=1.3$, $H_1=H_2=400$ nm, $W_2=100$ nm, $L_1=L_2=350$ nm, illumination by a plane wave at wavelength λ=550 nm. Dashed grey lines correspond to dependences obtained from the approximate formulas. Solid lines are the results of CST simulations.

It can observe that all characteristics ($R_f$, $H_f$ and power density) increase when W1 increases. The increase of the discrepancy between analytical and numerical results for the inhomogeneous systems with dimensions larger than a few wavelengths of an incident wave is related to the interplay between the nanojet and Fresnel diffraction phenomenon.

Figure 9A:
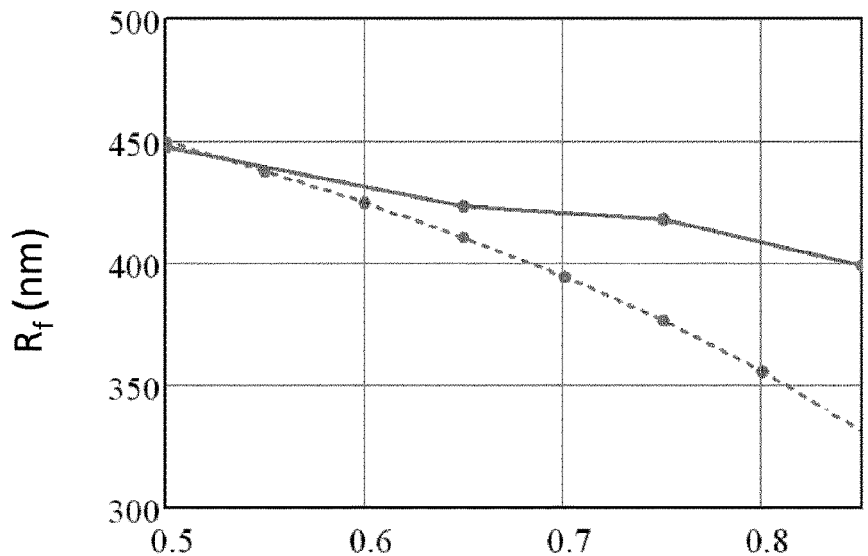
FIGS. 9a, 9b and 9c illustrate how position of nanojet hot spot (FIGS. 8a and 8b) and power density of nanojet beam at hot spot (FIG. 8c) vary as a function of the refractive index of an insert of an inhomogeneous microlens, according to an embodiment of the disclosure.
Figure 9B:
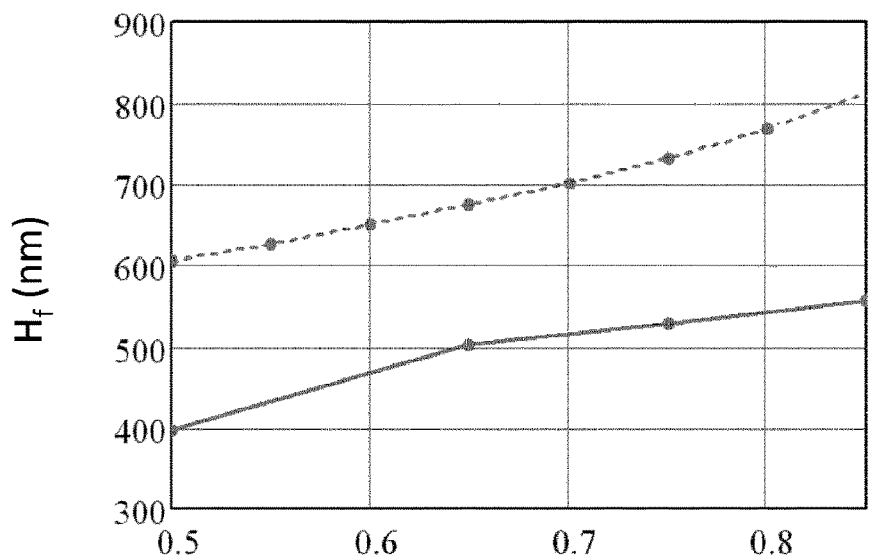
Figure 9C:
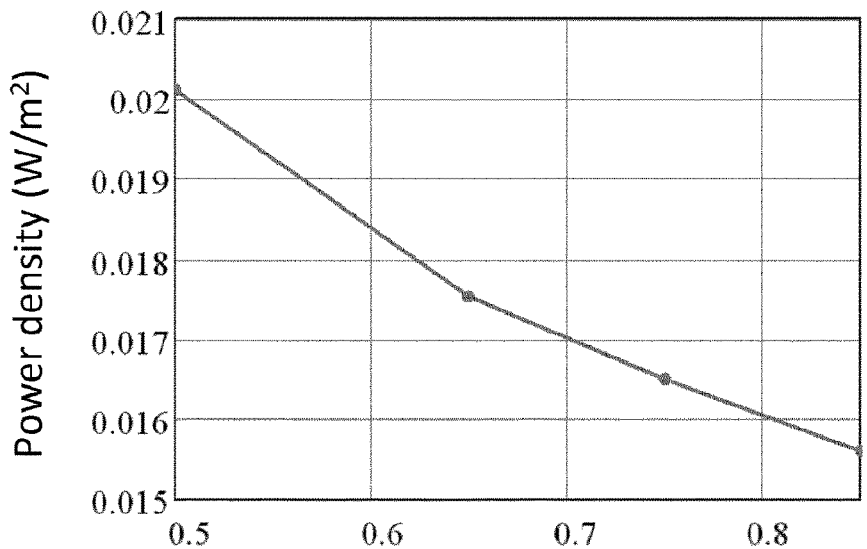

Dependence on the Refractive Index Ratio of the Constitutive Parts of the Microlens FIGS. 9a, 9b and 9c show the variation of hot spot position (FIGS. 9a and 9b) and power density (FIG. 9c) as a function of the refractive index $n_3$ of the insert, for a inhomogeneous microlens with $H_1=H_2$. More particularly, following parameters are used for the simulation: $n_1=1$, $n_2=2$, $H_1=H_2=400$ nm, $W_1=800$ nm, $L_1=L_2=275$ nm, illumination by a plane wave at wavelength λ=550 nm. Dashed grey lines correspond to dependences obtained from the approximate formulas. Solid lines are the results of CST simulations.

It can be observed that the power density in the hot spot of microlens falls with the refractive index $n_3$ of the insert material. Additionally, it can be seen that increasing $n_3$ lift up and shift hot spots closer to the center of the inhomogeneous microlens.

Dependence on the Wavelength of the Incident Wave

FIGS. 10a and 10b illustrate power density distribution in the xz-plane at different wavelengths for symmetrical inhomogeneous microlens of two different sizes: $W_1=800$ nm and $H_1=H_2=300$ nm for the simulation of FIG. 10a, and $W_1=900$ nm, $H_1=H_2=400$ nm for the simulation of FIG. 10b. Other parameters stay the same for both simulation: $n_1=1$, $n_2=2$, $n_3=1.3$, $L_1=L_2=370$ nm, $W_2=100$ nm.

Figure 10C:
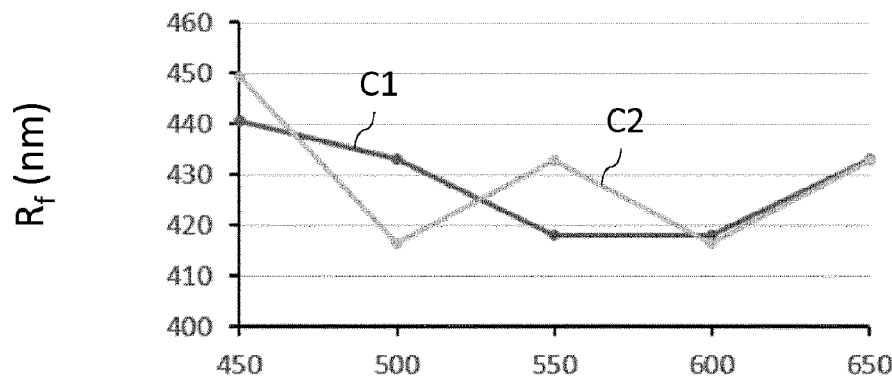
FIGS. 10c, 10d and 10e illustrate how position of nanojet hot spot (FIGS. 10c and 10d) and power density of nanojet beam at hot spot (FIG. 10e) vary as a function of the wavelength of the wave plane illuminating the inhomogeneous microlens, for two sizes of microlens, according to an embodiment of the disclosure.
Figure 10D:
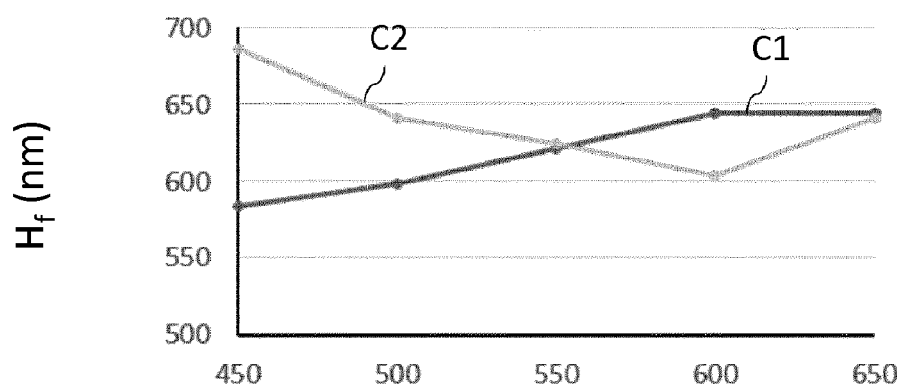
Figure 10E:
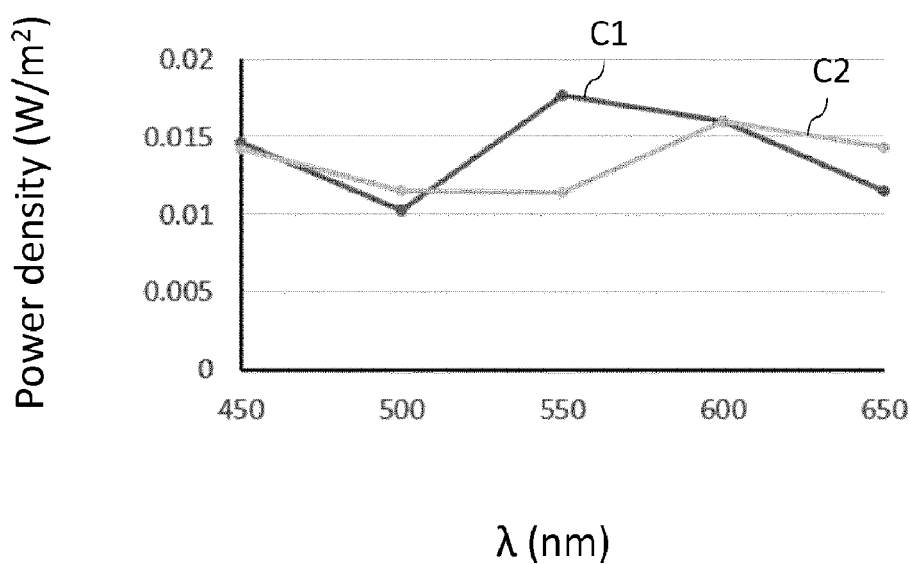

FIGS. 10c, 10d and 10e shows the variation of hot spot position (FIGS. 10c and 10d) and power density (FIG. 10e) as a function of the wavelength of the incident plane wave, for symmetrical inhomogeneous microlens of two different heights (with $H_1=H_2$). More particularly, following parameters are used for the simulation: $n_1=1$, $n_2=2$, $n_3=1.3$, $W_1=800$ nm, $L_1=L_2=370$ nm, $W_2=100$ nm. Lines C1 correspond to $H_1=H_2=300$ nm, lines C2 corresponds to $H_1=H_2=500$ nm.

The dependencies observed in FIGS. 10a to 10c are obtained for microlenses with $W_1>λ$, and demonstrate that the proposed system is dispersive. Particularly, in FIGS. 10c, 10d and 10e, the sensitivity of the power density and hot spot position to the height of the system can be observed.

Focal Length Control

Figure 11A:
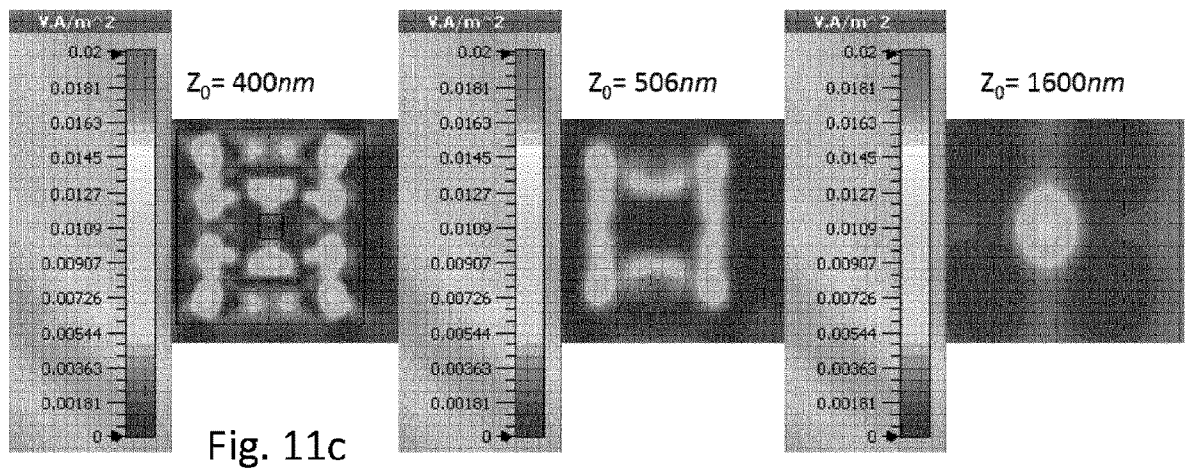
FIG. 11a illustrates a simulated exemplary topology of an inhomogeneous microlens with an insert, according to an embodiment of the present disclosure.
Figure 11A:
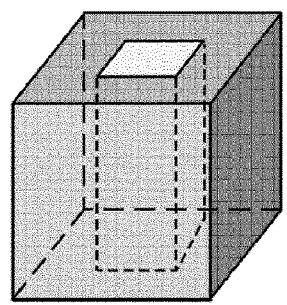
Figure 11B:
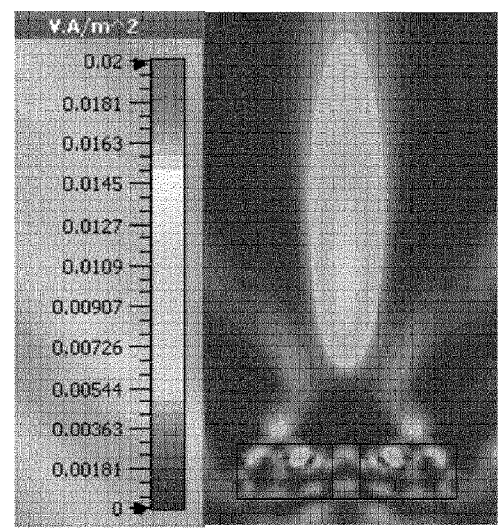
Figure 11D:
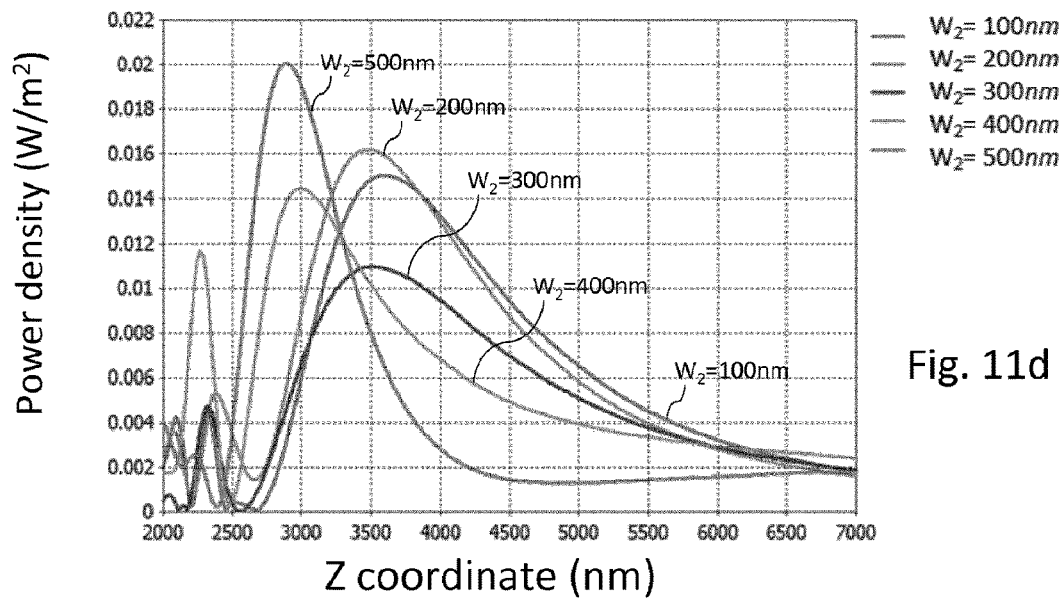
FIG. 11d illustrates how power density of the field generated by an inhomogeneous microlens having the topology of FIG. 11a vary as a function of a distance to the microlens, for different width of insert, according to an embodiment of the disclosure.
Figure 11E:
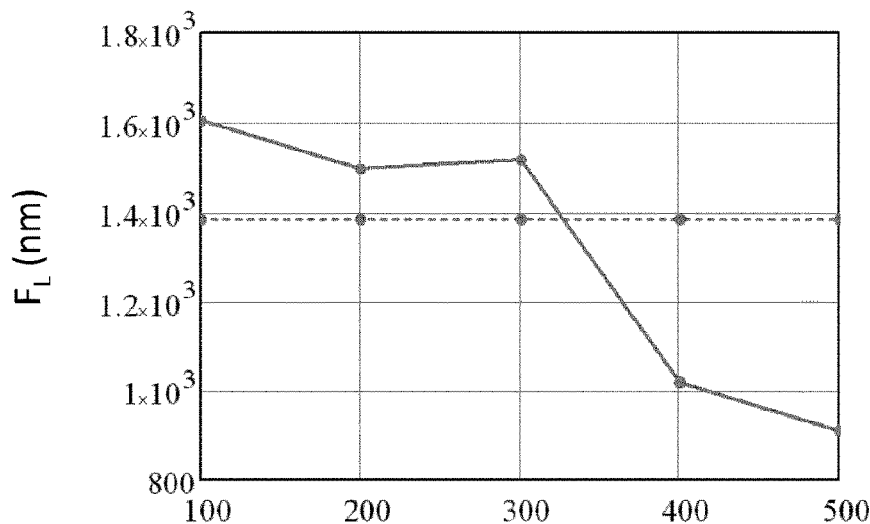
FIGS. 11e and 11f illustrate how position of nanojet hot spot (FIG. 11e) and power density of nanojet beam at hot spot (FIG. 11f) vary as a function of the width of the insert, for an inhomogeneous microlens having the topology of FIG. 11a, according to an embodiment of the disclosure.
Figure 11F:
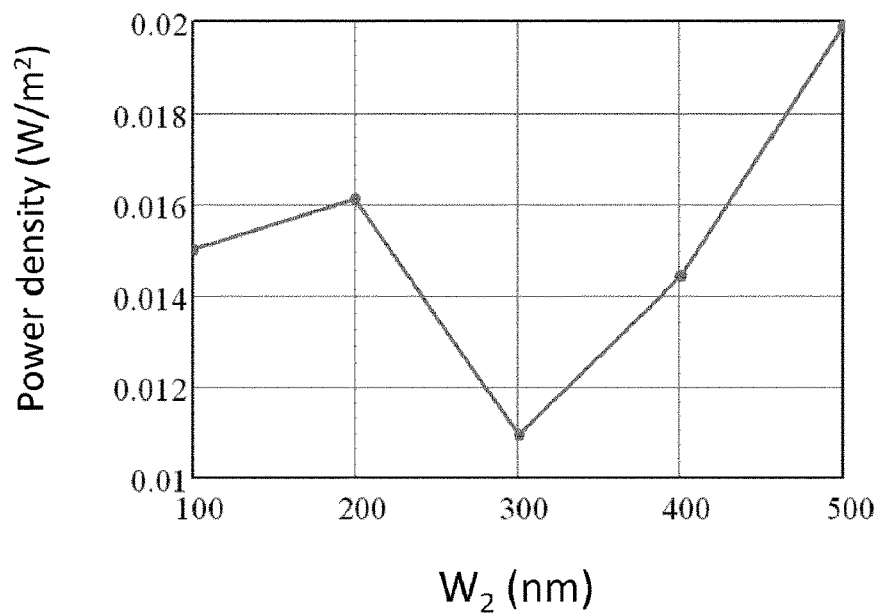

FIGS. 11b, 11c, 11d, 11e and 11f illustrate power density distribution of nanojet beams generated by a inhomogeneous microlens having the system topology presented in relation with FIG. 11a. More particularly, FIG. 11b shows the power density distribution in the xz-plane of the inhomogeneous microlens, and FIG. 11c shows the power density distribution in the xy-plane of the inhomogeneous microlens at three different $Z_0$, $Z_0$ being the distance along the z-axis from the bottom edge of the main part of the microlens. FIG. 11d is a graph showing the evolution of the power density as a function of Z coordinate, for five different widths of the insert. FIGS. 11e and 11f shows the variation of hot spot position (FIG. 11e) and power density (FIG. 10f) as a function of the insert width $W_2$ (dashed grey lines correspond to the dependency obtained from the approximate formulas, and solid lines are the results of CST simulations). Following parameters are used for the simulation: $n_1=1$, $n_2=2$, $n_3=1.3$, $W_1=L_1=800$ nm, $W_2=L_2=100$ nm (only for FIGS. 1b and 1c), $H_1=H_2=400$ nm, illumination by a plane wave at $\lambda=550$ nm.

It should be noted that for the systems with $W_1 > \lambda$, an intensive nanojet beam oriented along the axis of the symmetry for the main part can be additionally observed. Generally, the focal distance $F_L$ of a homogeneous microlens is determined by the width and refractive index of the main part (see equation (2)), but the presence of the insert affects this parameter. More particularly, FIGS. 11d, 11e and 11f demonstrate that hot spot position, power density and length of this nanojet are sensitive to the width $W_2$ of the insert. For example, it can be observed that the focal position is closer to the surface of the microlens for the system with wider inserts.

It can be noted that changing the total size of the system and of an insert along y-axis and changing the topology of an insert makes it possible to manage the power distribution at different distances from the top of microlens. For example, it is possible to have a microlens geometry that allows splitting the nanojet along the diagonal at $Z_0=400$ nm, as shown in relation with FIG. 11c.

5.2.2 Non-symmetrical System

Some simulation results for non-symmetrical inhomogeneous microlens as illustrated for example in FIG. 1c, that is system where the insert and the microlens does not share a same axis of symmetry, are now presented.

Figure 12:
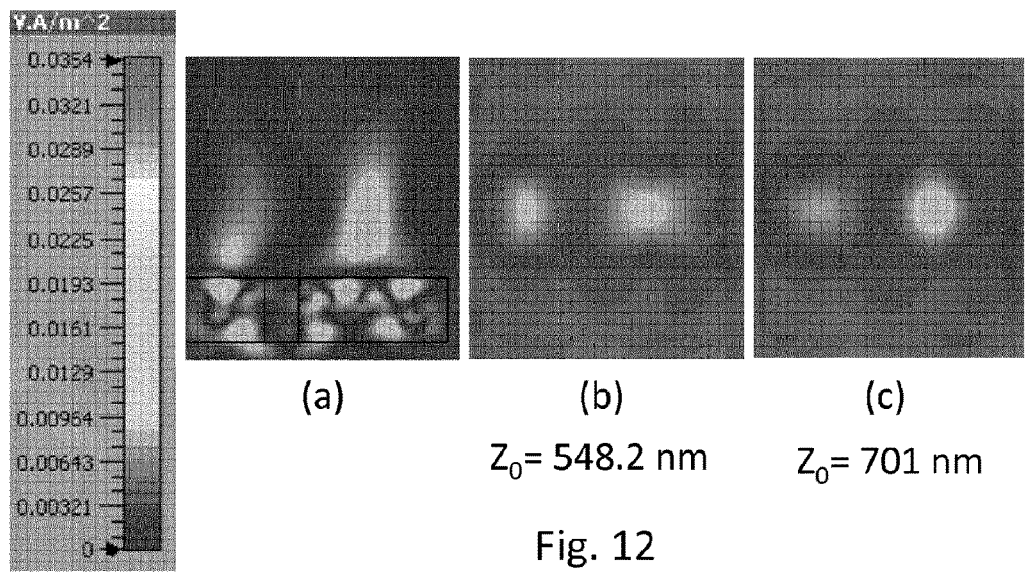
FIG. 12 shows an example of the power density distribution of the nanojet beams generated by a non-symmetrical inhomogeneous microlens, according to an embodiment of the disclosure.

FIGS. 12a, 12b and 12c illustrate power density distribution of nanojet beams generated by a non-symmetrical inhomogeneous microlens. More particularly, FIG. 12a shows the power density distribution in the xz-plane, and FIGS. 12b and 12c show the power density distribution in the xy-plane at two different hot spot positions $Z_0$ ($Z_0=548.2$ nm in FIG. 12b and $Z_0=701$ nm in FIG. 12c). Following parameters are used for the simulation: $n_1=1$, $n_2=2$, $n_3=1.3$, $W_1=800$ nm, $H_1=H_2=400$ nm, $W_2=100$ nm, $W_s=300$ nm, $L_1=L_2=350$ nm, illumination by a plane wave at $\lambda=550$ nm. $W_s$ represents a position of the left edge of the insert regarding the axis of the symmetry for the main constitutive part of the microlens, as illustrated in relation with FIGS. 1b and 1c. If $W_s \neq W_2$, the system is non-symmetrical, as shown for example in FIG. 1c.

As it can be observed on FIGS. 12a, 12b and 12c, the use of a non-symmetrical inhomogeneous microlens leads to the redistribution of the nanojet power density: two nanojets with different characteristics and angles of deviation are obtained. This phenomenon can be explained by the power density non-equality for the various nanojets generated by the edges of the system.

Figure 13A:
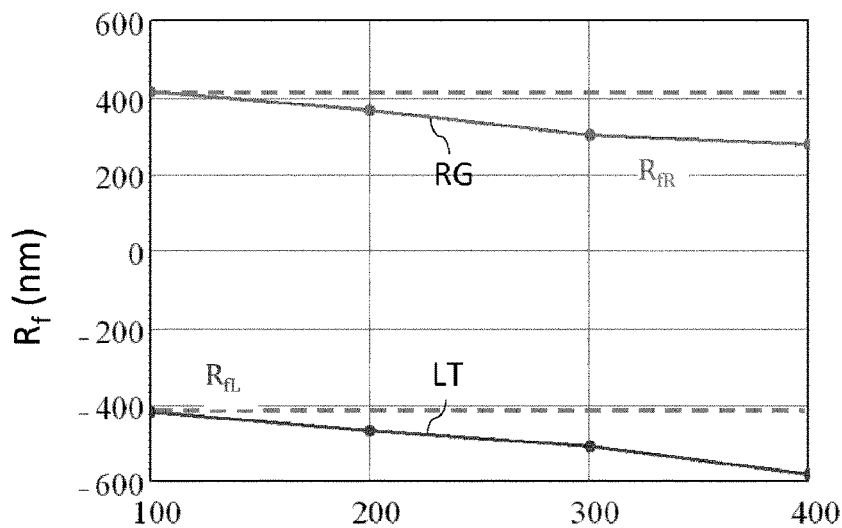
FIGS. 13a, 13b and 13c illustrate how position of nanojet hot spot (FIGS. 13a and 13b) and power density of nanojet beam at hot spot (FIG. 13c) vary as a function of a shift of an axis of symmetry of the insert relatively to an axis of symmetry of the main part of an inhomogeneous microlens, according to an embodiment of the disclosure.
Figure 13B:
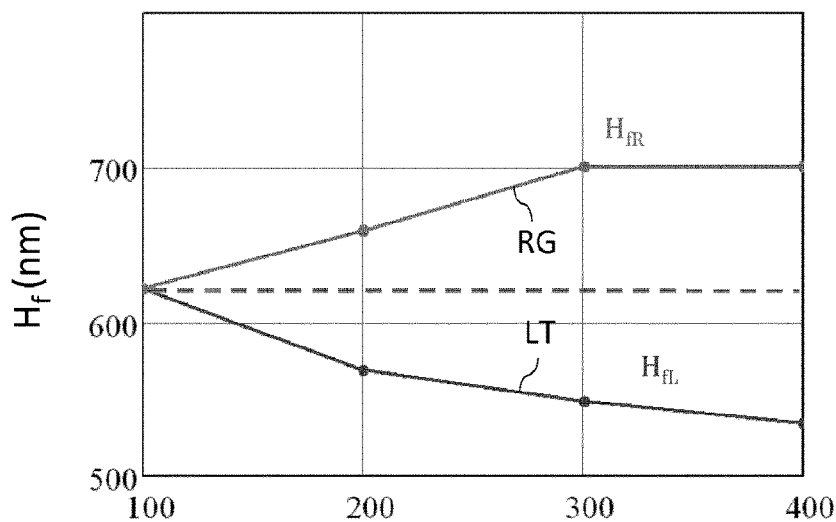
Figure 13C:
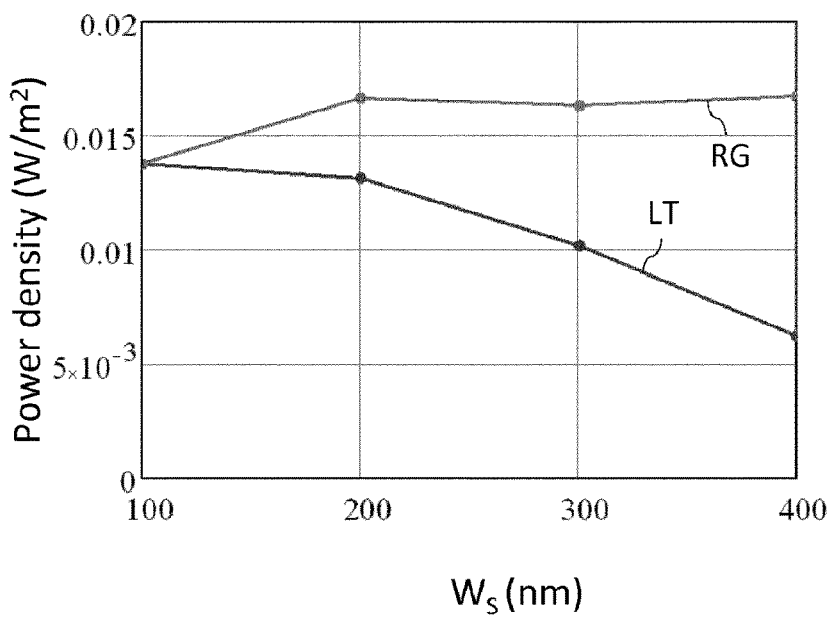

FIGS. 13a, 13b and 13c show the variation of hot spot position (FIGS. 13a and 13b) and power density (FIG. 13c) as a function of $W_s$, with the following parameters: $n_1=1$, $n_2=2$, $n_3=1.3$, $W_1=800$ nm, $H_1=H_2=400$ nm, $W_2=100$ nm, $L_1=L_2=350$ nm, illumination by a plane wave at $\lambda=550$ nm. Lines RG correspond to the right hot spot, and lines LT correspond to the left hot spot. Dashed grey lines on FIGS. 13a and 13b show the position of nanojet hot spots for a symmetrical system, as a comparative base. As it can be noted from these figures, the power density and hot spot position depend on the position of the insert in the system: non-symmetrical response is observed for non-equal parts of such an inhomogeneous system.

5.3 Advantages of the Proposed Technique and Practical Application

According to an aspect of the present disclosure, an inhomogeneous microlens with at least one insert has been described. As explained throughout the document, the inventors have found that diffraction of a plane wave on such an inhomogeneous microlens, with the insert having a lower refractive index than that of the host medium ($n_3 < n_2 > n_1$), can result in possibility to manage the nanojets hot spot position in a space above the surface of the microlens and transform the near field pattern by adjusting some parameters (refractive index, size, shape and position) of the insert. Additionally, inhomogeneous microlens according to the proposed technique provides:

- dependence of the response of the system on the side of electromagnetic wave incidence for some topologies;
- dependence of the response on the wavelength;
- the possibility to obtain non-symmetrical response depending on the position of an insert;
- a simple topology, compatible with established planar micro/nano fabrication methods, e.g. nano-imprinting and photolithography.

Figures 14A, 14B:
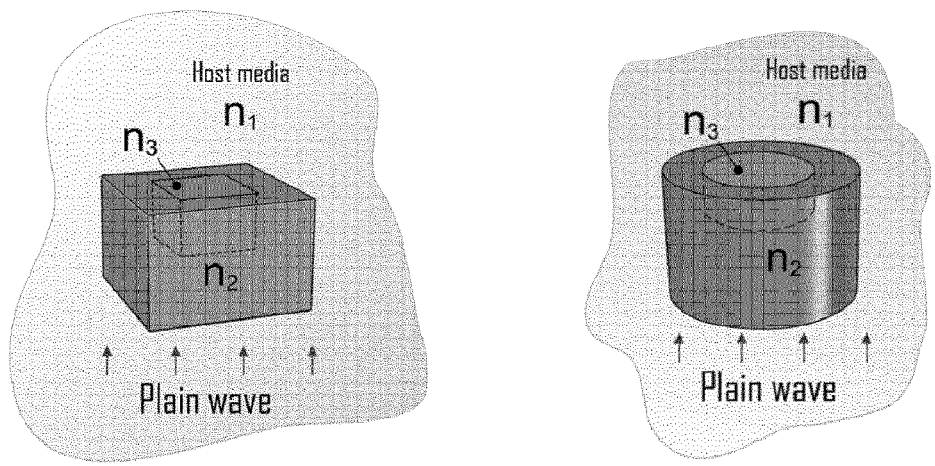
FIGS. 14a and 14b illustrate schematic views of possible implementations of an inhomogeneous microlens, such as cuboid (FIG. 14a) and cylinder (FIG. 14b), according to an embodiment of the disclosure.

The main part and insert of the proposed microlenses may be designed with different kind of shapes. FIGS. 14a and 14b illustrate schematic views of possible implementations such as cuboid (FIG. 14a) and cylinder (FIG. 14b), for an inhomogeneous nanojet microlens with bottom plane wave incidence. Similar shapes are also possible for inhomogeneous nanojet microlens with top plane wave incidence.

FIG. 15 illustrates schematic views of possible embodiments of a microlens according to the proposed technique, with different size, form and position of the insert and different shape of the main part. As it can be seen in the illustrated embodiments, the top surface of the insert may correspond to the top surface of the microlens, the height of the insert may be equal to or lower than the height of the microlens, and the length of the insert may be equal to or lower than the length of the microlens.

According to another aspect of the present disclosure, such an inhomogeneous microlens can be embedded in a host medium or placed on a dielectric substrate acting as a support layer. Material of the substrate can be selected arbitrary: it can be the same or different from the material of the main part of the microlens. Implementation of such microstructures is possible via standard lithography techniques. The dielectric material of the main part of the microlens and/or of the insert may be for example glass, plastic, or a polymer material. The structure can be illuminated both from the top or bottom.

As it has been presented throughout the present document, material properties and dimensions of the constitutive parts of a microlens according to the proposed technique may be adjusted so as to provide a desired focusing function. More particularly, these parameters may be adjusted so as to allow generating at least two nanojet beams having desired characteristics (in terms of power density distribution, position, etc.) located out of the axis of symmetry of the microlens main part.

This property to form nanojet beams out of the axis of symmetry of a single element main part can be exploited to design non-complicated diffraction gratings having high diffraction efficiency. Diffraction gratings have numerous potential applications. For example, the operating principle of an optical see-through near-eye display (NED) can rely on the use of a diffractive light guide for the exit-pupil-expander (EPE). On the EPE plate, the in-coupling grating divides the incoming ray of light to ±1st diffraction orders. Usually, high diffraction efficiency is achieved by thick diffractive holograms or by diffraction gratings made out of deep slanted grooves. The attainable field of view can be increased by dividing the EPE functionality to two separated, stacked plates. One of the plates covers positive angles of incidence and the other covers negative angles of incidence. The main problems of such conventional architecture are the complexity of the master fabrication and mass replication as well as the small angular bandwidth (related to the resulting field of view). However, microlenses according to the present disclosure allow building diffraction gratings that overcome these problems of the prior art.

More particularly, it is proposed to force a far-field pattern thanks to the diffraction grating and then to force the amplification of the diffraction efficiency for a particular diffracted order thanks to the nanojet phenomenon. FIG. 16 shows possible embodiments of a proposed diffraction grating (periodic array of the elements), comprising optically-transparent devices as described in the present disclosure, i.e. containing an insert within a main part (and thus referred to hereafter as "double-material elements"), that are embedded into a dielectric material with refractive index $n_1$. The grating constant (i.e. the period of the grating) is d. A linearly-polarized plane wave is normally incident on the grating from the top in a plane perpendicular to the grating. Angles of the diffracted beams are not affected by the structure of the microlenses. They are determined by the period of the grating, wavelength of the incident plane wave and angle of wave incidence, and can be calculated according to the grating equation.

The performance of the grating depends on the polarization of the incident wave and parameters (dimensions, form and material) of the elements. Unlike diffraction gratings containing symmetrical single-material elements/microlenses (regular structure of the same spacing), the proposed diffraction grating based on the double-material elements with the inserts achieves symmetrical distribution of an intensity ($T_j=T_{-j}$, $R_j=R_{-j}$, . . . , where j is the number of diffraction order) leading to the suppression of direct transmission (zero order of diffraction, which has maximum grating efficiency in a case of symmetrical single-material elements) and redistribution of diffracted light and increasing of grating efficiency for the desired non-zero diffraction order (±1, for example).

In other embodiments presented in relation with FIG. 17, the diffraction grating comprises a layer forming a substrate for the double-material elements with the inserts. The refractive index of the substrate is $n_4$. Several possible realizations of the gratings in 3D space are illustrated in relation with FIG. 18.

Figure 19A:
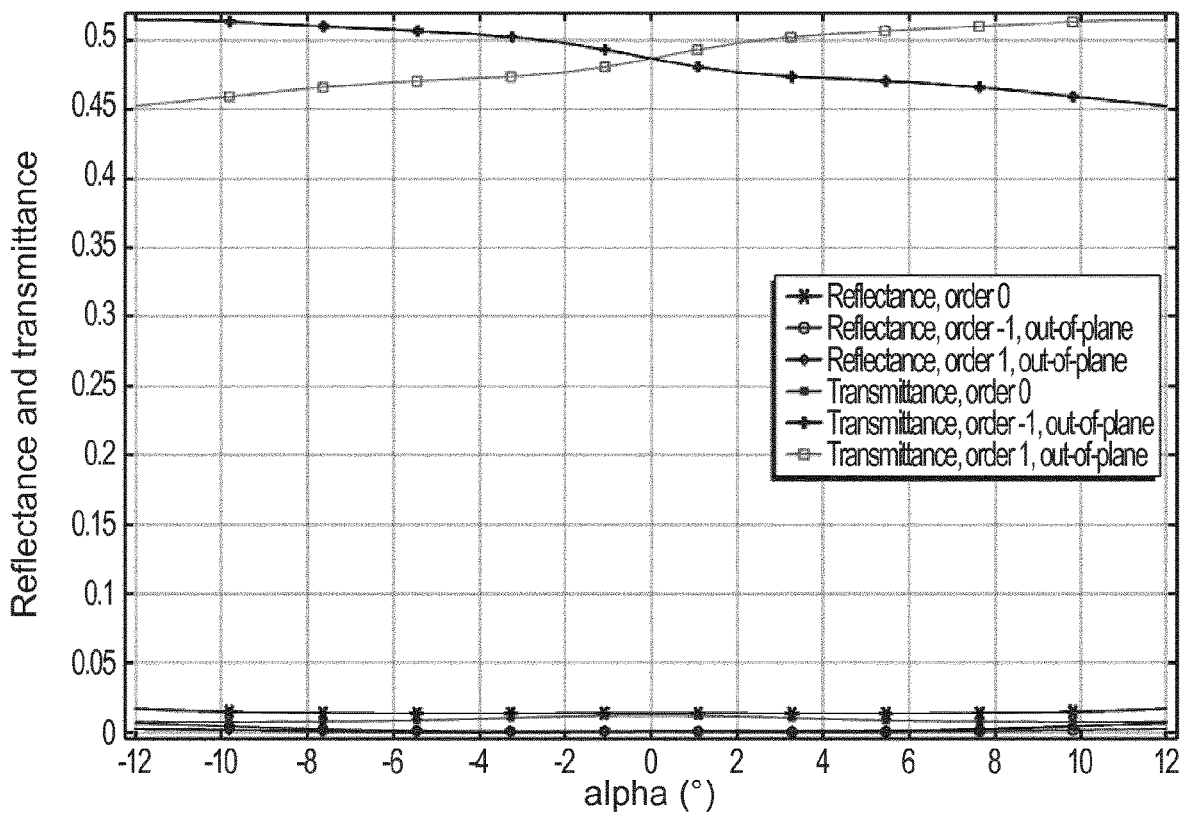
Figure 19B:
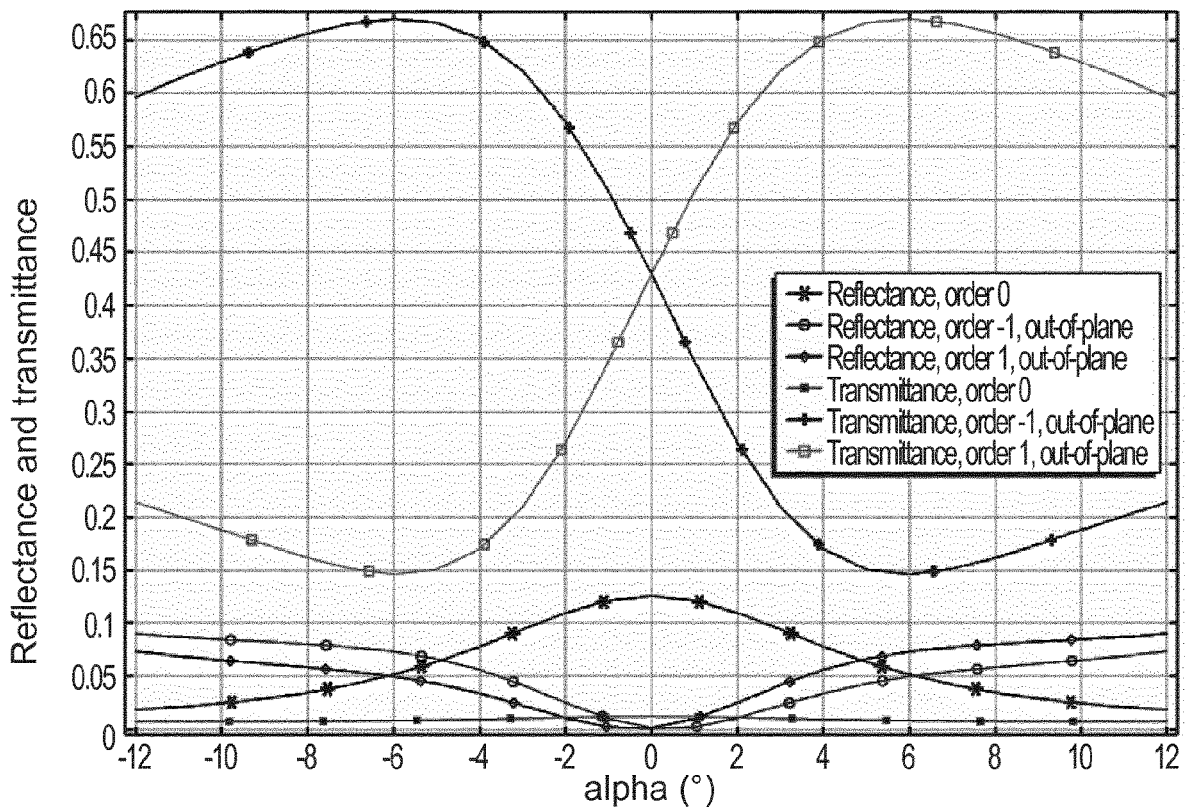

The computed reflectance and transmittance for TE incidence in a case of embodiments (a) and (b) presented in FIG. 16 are plotted respectively in graph (a) and (b) of FIG. 19. It illustrates reflectance and transmittance for 0 and ±1 orders at λ=625 nm for a grating embedded into a dielectric material with refractive index $n_1$=1 and with the period d=1000 nm and double-material microlenses with the following parameters: $n_2$=2.25, $n_3$=1.514, $W_1$=180 nm, $W_2$=80 nm, $H_1$=340 nm, $H_2$=220 nm. It is assumed that the systems are so-called infinite in x-direction (i.e. the gratings have more than ten periods). It can be seen, that such system can have very high (almost symmetrical for negative and positive angles of incidence) transmittance for the ±1st orders (see FIG. 19(a)) for the 24° of field of view (FOV). All another diffraction orders will be suppressed. The diffraction uniformity (homogeneity of the diffraction efficiency) for this range of the angles reaches≈94%. The presented system demonstrates the nonreciprocal response. Changing the side of electromagnetic wave incidence makes it possible to get different characteristics (see FIG. 19(b) associated with the embodiment presented in FIG. 16(b)). For example, it is possible to dramatically reduce the efficiency for the 1st order at negative angles of incidence.

Similarly, the power flow distribution in xz-plane for the periodic array of the elements with the inserts placed on a dielectric substrate has been simulated: the computed reflectance and transmittance for TE incidence in a case of embodiments (a) and (b) presented in FIG. 17 are plotted respectively in graph (a) and (b) of FIG. 20. The parameters used coincide with the parameters of the arrays presented in FIG. 19, with the addition of the refractive index for the substrate which has been set to $n_4=n_3$=1.514. The comparison with the FIG. 19 allows observing the effect of the substrate on the diffraction efficiency of the grating. Moreover, the effect of the position of the inserts on this characteristic can also be observed. Analysing the field distribution for the presented case, one can conclude that the diffracted light has maxima when the position of the hot spot is close to the boundary between the element and substrate and intensity of the hot spot is maximal.

To determine the dependence of the grating efficiency on the size of the elements and inserts, one can consider the effect of the heights $H_1$ and $H_2$ on the reflectance and transmittance of the light incident onto the grating presented in embodiment (a) of FIG. 17. For example, effect on transmittance for 1st diffraction order is presented in relation with FIG. 21. Following parameters are used: λ=625 nm, d=1000 nm, $n_1$=1, $n_2$=2.25, $n_3=n_4$=1.514, $W_1$=180 nm, $W_2$=80 nm. The presented dependence helps to optimize the parameters of the system.

It is also possible to analyze the response of the system when the diffraction grating comprises non-symmetrical elements, as discussed in section 5.2.2 of the present disclosure. FIG. 22 shows reflectance and transmittance as a function of distance $W_s$, for diffraction gratings comprising non-symmetrical elements placed on a dielectric substrate for the normal incidence of the plane wave. Following parameters are used: λ=625 nm, d=1000 nm, $n_1$=1, $n_2$=2.25, $n_3=n_4$=1.514, $W_1$=180 nm, $W_2$=80 nm, $H_1$=340 nm, $H_2$=220 nm. More particularly, FIG. 22 shows that changing the position of the insert makes it possible to get non-symmetrical redistribution between the positive and negative diffraction orders of the same number.

The invention claimed is:

1. An optically-transparent device, the device being configured to form a field intensity distribution in a near zone of the device from an electromagnetic wave incident on the device, wherein the device is embedded in a first dielectric material having a first refractive index $n_1$, the device comprising:
a main part, the main part made of a second dielectric material having a second refractive index $n_2$, wherein the second refractive index $n_2$ is higher than the first refractive index $n_1$; and
at least one insert, the at least one insert made of a third dielectric material having a third refractive index $n_3$ that is lower than the second refractive index $n_2$, the third refractive index $n_3$ being different from the first refractive index $n_1$, and the at least one insert being within the main part, wherein a width of the main part and a width of the at least one insert are configured so that $W_1-W_2 \geq \lambda/2$ and $2W_1 \leq 10\lambda$, with $W_1$ corresponding to a half-width of the main part, $W_2$ corresponding to a half-width of the at least one insert, and $\lambda$ corresponding to a wavelength of the electromagnetic wave in the main part, and wherein each of the at least one insert or the main part and a lateral surface of the at least one insert or the main part, the base surface being defined with respect to an arrival direction of the electromagnetic wave, wherein the optically-transparent device is configured to form at least a first nanojet beam and a second nanojet beam, and wherein a first focal position of the first nanojet beam is different from a second focal position of the second nanojet beam.

2. The optically-transparent device of claim 1, wherein, when the electromagnetic wave is incident from a bottom surface of the optically-transparent device, the optically-transparent device is configured to form two nanojet beams located respectively at focal positions $(R_{fL}, H_{fL})$ and $(R_{fR}, H_{fR})$ given by approximate formulas:

$$R_{fL} \approx \frac{\tan\Theta_{B2} W_1 + \tan\Theta_{B1}\tan\Theta_{B2}(H_2 - H_1) + \tan\Theta_{B1} W_s}{\tan\Theta_{B1} + \tan\Theta_{B2}}, H_{fL} \approx \frac{W_1 - R_{fL}}{\tan\Theta_{B1}}$$

$$R_{fR} \approx \frac{\tan\Theta_{B2} W_1 + \tan\Theta_{B1}\tan\Theta_{B2}(H_2 - H_1) + \tan\Theta_{B1}(2W_2 - W_s)}{\tan\Theta_{B1} + \tan\Theta_{B2}},$$

$$H_{fR} \approx \frac{W_1 - R_{fR}}{\tan\Theta_{B1}},$$

where $R_{fL}$ and $R_{fR}$ represent respectively a distance of the focal positions from an axis of symmetry of the main part, where $H_{fL}$ and $H_{fR}$ represent respectively a distance of the focal positions from the bottom surface of the optically-transparent device, where $H_1$ corresponds to a height of the main part, $W_1$ corresponds to the half-width of the main part, $H_2$ corresponds to a height of the at least one insert, and $W_2$ corresponds to the half-width of the at least one insert, and $W_S$ corresponds to a position of a left edge of the at least one insert with respect to the axis of symmetry of the main part, and where $\theta_{B2}$ is given by $$\theta_{B2} \approx \frac{90° - \sin^{-1}\left(\frac{n_3}{n_2}\right)}{2},$$

and $\theta_{B1}$ is given by $$\theta_{B1} \approx \frac{90° - \sin^{-1}\left(\frac{n_1}{n_2}\right)}{2}.$$

3. The optically-transparent device of claim 1, wherein, when the electromagnetic wave is incident from a top surface of the optically-transparent device, the optically-transparent device is configured to form two nanojet beams located respectively at focal positions $(R_{fL}, H_{fL})$ and $(R_{fR}, H_{fR})$ given by approximate formulas:

$$R_{fL} \approx \frac{\tan\Theta_{B2} W_1 + \tan\Theta_{B1} W_s}{\tan\Theta_{B1} + \tan\Theta_{B2}}, H_{fL} \approx \frac{W_1 - R_{fL}}{\tan\Theta_{B1}}$$

$$R_{fR} \approx \frac{\tan\Theta_{B2} W_1 + \tan\Theta_{B1}(2W_2 - W_s)}{\tan\Theta_{B1} + \tan\Theta_{B2}}, H_{fR} \approx \frac{W_1 - R_{fR}}{\tan\Theta_{B1}},$$

where $R_{fL}$ and $R_{fR}$ represent respectively a distance of the focal positions from an axis of symmetry of the main part, where $H_{fL}$ and $H_{fR}$ represent respectively a distance of the focal positions from a bottom surface of the optically-transparent device, where $H_1$ corresponds to a height of the main part, $W_1$ corresponds to the half-width of the main part, $H_2$ corresponds to a height of the at least one insert, $W_2$ corresponds to the half-width of the at least one insert, and $W_S$ corresponds to a position of a left edge of the at least one insert with respect to the axis of symmetry of the main part, and where $\theta_{B2}$ is given by $$\theta_{B2} \approx \frac{90° - \sin^{-1}\left(\frac{n_3}{n_2}\right)}{2},$$

and $\theta_{B1}$ is given by $$\theta_{B1} \approx \frac{90° - \sin^{-1}\left(\frac{n_1}{n_2}\right)}{2}.$$

4. The optically-transparent device of claim 1, wherein each of a shape of the main part and a shape of the at least one insert is selected from the group consisting of: a cuboid, a cylinder, a cone, a truncated cone, and a prism.

5. The optically-transparent device of claim 1, wherein each of the main part and the at least one insert have a shape with non-vertical lateral surfaces.

6. The optically-transparent device of claim 1, wherein a top edge of the at least one insert coincides with a top edge of the main part and a first height of the at least one insert equals to a second height of the main part.

7. The optically-transparent device of claim 1, wherein the main part and the at least one insert share at least one same axis of symmetry.

8. The optically-transparent device of claim 1, wherein a first axis of symmetry perpendicular to a top surface of the at least one insert is shifted from a second axis of symmetry perpendicular to a top surface of the main part.

9. The optically-transparent device of claim 1, wherein the second dielectric material of the main part or the third dielectric material of the at least one insert is selected from the group consisting of: glass, plastic, and a polymer material.

10. A system comprising:
a dielectric host medium with a first refractive index $n_1$;
at least one optically-transparent device,
wherein each of the at least one optically-transparent device is configured to form a field intensity distribution in a near field zone of the optically-transparent device from an electromagnetic wave incident on the optically-transparent device, and wherein each of the at least one optically-transparent device is embedded in the dielectric host medium, the optically-transparent device comprising:
- a main part, the main part made of a second dielectric material having a second refractive index $n_2$,
- wherein the second refractive index $n_2$ is higher than the first refractive index $n_1$; and
- at least one insert, the at least one insert made of a third dielectric material having a third refractive index $n_3$ that is lower than the second refractive index $n_2$, the third refractive index $n_3$ being different from the first refractive index $n_1$, and the at least one insert being within the main part,
- wherein a width of the main part and a width of the at least one insert are configured so that $W_1 - W_2 \geq \lambda/2$ and $2W_1 \leq 10\lambda$, with $W_1$ corresponding to a half-width of the main part, $W_2$ corresponding to a half-width of the at least one insert, and $\lambda$ corresponding to a wavelength of the said incident electromagnetic wave in the main part, and
- wherein each of the at least one insert and the main part have respectively an edge of a step formed by a base surface of the at least one insert or the main part and a lateral surface of the at least one insert or the main part, the base surface being defined with respect to an arrival direction of the electromagnetic wave; and
- a support layer made of a dielectric substrate with a fourth refractive index $n_4$,
- wherein the at least one optically-transparent device is on the support layer.

11. The system of claim 10, wherein, when the electromagnetic wave is incident from a bottom surface of the optically-transparent device, the optically-transparent device is configured to form two nanojet beams located respectively at focal positions $(R_{fL}, H_{fL})$ and $(R_{fR}, H_{fR})$ given by approximate formulas:

$$R_{fL} \approx \frac{\tan\Theta_{B2} W_1 + \tan\Theta_{B1} \tan\Theta_{B2}(H_2 - H_1) + \tan\Theta_{B1} W_s}{\tan\Theta_{B1} + \tan\Theta_{B2}}, H_{fL} \approx \frac{W_1 - R_{fL}}{\tan\Theta_{B1}}$$

$$R_{fR} \approx \frac{\tan\Theta_{B2} W_1 + \tan\Theta_{B1} \tan\Theta_{B2}(H_2 - H_1) + \tan\Theta_{B1}(2W_2 - W_s)}{\tan\Theta_{B1} + \tan\Theta_{B2}},$$

$$H_{fR} \approx \frac{W_1 - R_{fR}}{\tan\Theta_{B1}},$$

where $R_{fL}$ and $R_{fR}$ represent respectively a distance of the focal positions from an axis of symmetry of the main part,
where $H_{fL}$ and $H_{fR}$ represent respectively a distance of the focal positions from the bottom surface of the optically-transparent device,
where $H_1$ corresponds to a height of the main part, $W_1$ corresponds to the half-width of the main part, $H_2$ corresponds to a height of the at least one insert, $W_2$ corresponds to the half-width of the at least one insert, and $W_S$ corresponds to a position of a left edge of the at least one insert with respect to the axis of symmetry of the main part, and
where $\Theta_{B2}$ is given by $$\theta_{B2} \approx \frac{90° - \sin^{-1}\left(\frac{n_3}{n_2}\right)}{2},$$

and $\theta_{B1}$ is given by $$\theta_{B1} \approx \frac{90° - \sin^{-1}\left(\frac{n_1}{n_2}\right)}{2}.$$

12. The system of claim 10, wherein, when the electromagnetic wave is incident from a top surface of the optically-transparent device, the optically-transparent device is configured to form two nanojet beams located respectively at focal positions $(R_{fL}, H_{fL})$ and $(R_{fR}, H_{fR})$ given by approximate formulas:

$$R_{fL} \approx \frac{\tan\Theta_{B2} W_1 + \tan\Theta_{B1} W_s}{\tan\Theta_{B1} + \tan\Theta_{B2}}, H_{fL} \approx \frac{W_1 - R_{fL}}{\tan\Theta_{B1}}$$

$$R_{fR} \approx \frac{\tan\Theta_{B2} W_1 + \tan\Theta_{B1}(2W_2 - W_s)}{\tan\Theta_{B1} + \tan\Theta_{B2}}, H_{fR} \approx \frac{W_1 - R_{fR}}{\tan\Theta_{B1}},$$

where $R_{fL}$ and $R_{fR}$ represent respectively a distance of the focal positions from an axis of symmetry of the main part,
where $H_{fL}$ and $H_{fR}$ represent respectively a distance of the focal positions from a bottom surface of the optically-transparent device,
where $H_1$ corresponds to a height of the main part, $W_1$ corresponds to the half-width of the main part, $H_2$ corresponds to a height of the at least one insert, $W_2$ corresponds to the half-width of the at least one insert, and $W_S$ corresponds to a position of a left edge of the at least one insert with respect to the axis of symmetry of the main part, and
where $\theta_{B2}$ is given by $$\theta_{B2} \approx \frac{90° - \sin^{-1}\left(\frac{n_3}{n_2}\right)}{2},$$

and $\theta_{B1}$ is given by $$\theta_{B1} \approx \frac{90° - \sin^{-1}\left(\frac{n_1}{n_2}\right)}{2}.$$

13. The system of claim 10,
wherein, the optically-transparent device is configured to form at least a first nanojet beam and a second nanojet beam,
wherein a first focal position of the first nanojet beam is different from a second focal position of the second nanojet beam.

14. The system of claim 10, wherein a first axis of symmetry perpendicular to a top surface of the at least one insert is shifted from a second axis of symmetry perpendicular to a top surface of the main part.

* * * * *